(12) United States Patent
Zhang et al.

(10) Patent No.: US 10,873,942 B2
(45) Date of Patent: Dec. 22, 2020

(54) CODE BLOCK GROUP FEEDBACK TECHNIQUES FOR MULTIPLE CARRIERS OR TRANSMISSION TIME INTERVALS

(71) Applicant: QUALCOMM Incorporated, San Diego, CA (US)

(72) Inventors: Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/030,684

(22) Filed: Jul. 9, 2018

(65) Prior Publication Data

US 2019/0021088 A1    Jan. 17, 2019

Related U.S. Application Data

(60) Provisional application No. 62/531,444, filed on Jul. 12, 2017.

(51) Int. Cl.
*H04W 4/00* (2018.01)
*H04W 72/04* (2009.01)
(Continued)

(52) U.S. Cl.
CPC ...... *H04W 72/0453* (2013.01); *H04B 7/0623* (2013.01); *H04L 1/1614* (2013.01);
(Continued)

(58) Field of Classification Search
CPC ............. H04W 72/0453; H04W 72/12; H04L 1/1864; H04L 1/1628; H04L 1/1614; H04B 7/0623
(Continued)

(56) References Cited

U.S. PATENT DOCUMENTS

2016/0036578 A1* 2/2016 Malladi ............... H04L 5/0057
370/329
2016/0119948 A1 4/2016 Damnjanovic et al.
(Continued)

FOREIGN PATENT DOCUMENTS

EP         3166249 A1      5/2017
WO   WO2017206585 A1     12/2017
WO   WO2018002410 A1      1/2018

OTHER PUBLICATIONS

Mediatek Inc: "On Multiple HARQ Bits per TB and Feedback Mechanism", 3GPP Draft; R1-1702738 on Multiple HARQ Bits per TB and Feedback Mechanism_Final, 3rd Generation Partnership Project (3gpp), Mobile Competence Centre; 650, Route Des Lucioles; F-06921 Sophia-Antipol, vol. RAN WG1, No. Athens, Greece; Feb. 13, 2017-Feb. 17, 2017, Feb. 12, 2017 (Feb. 12, 2017), 4 Pages, XP051209885, Retrieved from the Internet: URL: http://www.3gpp.org/ftp/Meetings_3GPP_SYNC/RAN1/Docs/ [retrieved on Feb. 12, 2017].
(Continued)

*Primary Examiner* — Mang Hang Yeung
(74) *Attorney, Agent, or Firm* — Holland & Hart LLP

(57) ABSTRACT

Methods, systems, and devices for wireless communication are described that provide for configuration of multiple component carriers (CCs) or multiple transmission time intervals (TTIs) for data transmission to a user equipment (UE). Feedback resources may be configured for transmission of feedback information from the UE, and one or more CCs or TTIs may be configured for either code block group (CBG) feedback or transport block (TB) feedback, and one or more other CCs or TTIs may be configured for TB feedback. A UE may select whether to use CBG feedback or TB feedback for one or more CCs or TTIs, based at least in part on an amount of feedback information to be transmitted,
(Continued)

an amount of available feedback resources, an error pattern associated with one or more of the CCs or TTIs, or any combination thereof.

24 Claims, 20 Drawing Sheets

(51) Int. Cl.
  *H04L 1/16* (2006.01)
  *H04L 1/18* (2006.01)
  *H04B 7/06* (2006.01)
  *H04W 72/12* (2009.01)
(52) U.S. Cl.
  CPC .......... *H04L 1/1628* (2013.01); *H04L 1/1864* (2013.01); *H04W 72/12* (2013.01)
(58) Field of Classification Search
  USPC ........................................................ 370/329
  See application file for complete search history.

(56) References Cited

U.S. PATENT DOCUMENTS

| 2017/0026297 A1 | 1/2017 | Sun et al. |
| 2017/0064726 A1 | 3/2017 | Chen et al. |
| 2019/0215128 A1* | 7/2019 | Zhang ........................ H04L 1/16 |
| 2020/0059327 A1* | 2/2020 | Kini ........................ H04L 1/1861 |

OTHER PUBLICATIONS

Partial International Search Report—PCT/US2018/041386—ISA/EPO—dated Oct. 19, 2018(175112WO).

NTT DOCOMO, et al., "CBG Based (Re)Transmission, Preemption Indication and Subsequent Trasnsmission in NR", 3GPP Draft; R1-1708484, vol. RAN WG1, No. Hangzhou; May 15, 2017-May 19, 2017, May 14, 2017 (May 14, 2017), pp. 1-8, XP051273676, Retrieved from the Internet: URL: http://www.3gpp.org/ftp/Meetings_3GPP_SYNC/RAN1/Docs/ [retrieved on May 14, 2017].

LG Electronics: "Consideration on CB Group Based HARQ-ACK Feedback," 3GPP Draft; R1-1707662 NR CBG HARQ-ACK Final, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017, XP051272869, 6 pages, Retrieved from the Internet: URL: http://www.3gpp.org/ftp/Meetings_3GPP_SYNC/RAN1/Docs/ [retrieved on May 14, 2017].

International Search Report and Written Opinion—PCT/US2018/041386—ISA/EPO—dated Jan. 30, 2019 (175112WO).

* cited by examiner

US 10,873,942 B2

CODE BLOCK GROUP FEEDBACK TECHNIQUES FOR MULTIPLE CARRIERS OR TRANSMISSION TIME INTERVALS

CROSS REFERENCES

The present Application for Patent claims priority to U.S. Provisional Patent Application No. 62/531,444 by Zhang, et al., entitled "Code Block Group Feedback Techniques For Multiple Carriers or Transmission Time Intervals," filed Jul. 12, 2017, assigned to the assignee hereof, and expressly incorporated by reference in its entirety.

BACKGROUND

The following relates generally to wireless communication, and more specifically to code block group feedback techniques for multiple carriers or transmission time intervals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

SUMMARY

The described techniques relate to improved methods, systems, devices, or apparatuses that support the selection of a feedback scheme based at least in part on an amount of feedback information and available resources for transmitting the feedback information. Generally, the described techniques provide for configuration of multiple component carriers (CCs) or multiple transmission time intervals (TTIs) that may include data transmission to a user equipment (UE). Feedback resources may also be configured for transmission of feedback information (e.g., hybrid automatic repeat request (HARD) feedback information) from the UE. In some cases, one or more CCs or TTIs may be configured for either code block group (CBG) feedback or transport block (TB) feedback, and one or more other CCs may be configured for TB feedback. A UE receiving multiple CCs or transmissions in multiple TTIs that are to have feedback information provided in the feedback resources may select whether to use CBG feedback or TB feedback for one or more CCs or TTIs, based at least in part on, for example, an amount of feedback information to be transmitted, an amount of available feedback resources, an error pattern associated with one or more of the CCs or TTIs, or any combination thereof.

A method of wireless communication is described. The method may include identifying, at a UE, two or more CCs that are configured for either TB feedback or CBG feedback, identifying an amount of feedback resources available for transmitting feedback information, selecting TB feedback or CBG feedback for each of the two or more CCs based at least in part on the amount of feedback resources, and transmitting the feedback information to a base station according to the selecting.

An apparatus for wireless communication is described. The apparatus may include means for identifying, at a UE, two or more CCs that are configured for either TB feedback or CBG feedback, means for identifying an amount of feedback resources available for transmitting feedback information, means for selecting TB feedback or CBG feedback for each of the two or more CCs based at least in part on the amount of feedback resources, and means for transmitting the feedback information to a base station according to the selecting.

Another apparatus for wireless communication is described. The apparatus may include a processor, memory in electronic communication with the processor, and instructions stored in the memory. The instructions may be operable to cause the processor to identify, at a UE, two or more CCs that are configured for either TB feedback or CBG feedback, identify an amount of feedback resources available for transmitting feedback information, select TB feedback or CBG feedback for each of the two or more CCs based at least in part on the amount of feedback resources, and transmit the feedback information to a base station according to the selecting.

A non-transitory computer readable medium for wireless communication is described. The non-transitory computer-readable medium may include instructions operable to cause a processor to identify, at a UE, two or more CCs that are configured for either TB feedback or CBG feedback, identify an amount of feedback resources available for transmitting feedback information, select TB feedback or CBG feedback for each of the two or more CCs based at least in part on the amount of feedback resources, and transmit the feedback information to a base station according to the selecting.

In some examples of the method, apparatus, and non-transitory computer-readable medium described above, the selecting comprises determining a first number of CCs for which CBG feedback can be supported based at least in part on the amount of feedback resources, the first number of CCs being less than a second number of CCs that may be configured for either CBG feedback or TB feedback, and selecting at least a first CC of the two or more CCs for CBG feedback and at least a second CC of the two or more CCs for TB feedback.

In some examples of the method, apparatus, and non-transitory computer-readable medium described above, the first CC and the second CC may be selected for CBG feedback and TB feedback, respectively, based at least in part on an error pattern associated with each CC. In some examples of the method, apparatus, and non-transitory computer-readable medium described above, the error pattern comprises one or more of a bursty interference error pattern or an error rate of each CC. In some examples of the method, apparatus, and non-transitory computer-readable medium described above, the first CC and the second CC may be selected for CBG feedback and TB feedback, respectively, based at least in part on whether a UE is scheduled on each CC. In some examples of the method, apparatus, and non-transitory computer-readable medium described above, TB feedback may be selected for the CC on which a UE is not scheduled and CBG feedback may be selected for the CC on which a UE is scheduled.

In some examples of the method, apparatus, and non-transitory computer-readable medium described above, the transmitting comprises transmitting an indication of which of the two or more CCs may have CBG feedback, transmitting the CBG feedback for each CC of the two or more CCs that may be selected to may have CBG feedback, and transmitting TB feedback for any remaining CCs. In some examples of the method, apparatus, and non-transitory computer-readable medium described above, the indication of which of the two or more CCs may have CBG feedback comprises a CC index. In some examples of the method, apparatus, and non-transitory computer-readable medium described above, the CBG feedback comprises a bitmap indicating which CBGs of an associated CC may be successfully and unsuccessfully received.

In some examples of the method, apparatus, and non-transitory computer-readable medium described above, the transmitting comprises transmitting an indication of which of the two or more CCs may have CBG feedback, transmitting the CBG feedback for each CC of the two or more CCs that may be selected to may have CBG feedback, and transmitting TB feedback for any remaining CCs.

In some examples of the method, apparatus, and non-transitory computer-readable medium described above, the transmitting comprises transmitting TB feedback for each CC, transmitting an indication of which of the two or more CCs may have CBG feedback, and transmitting the CBG feedback for each CC of the two or more CCs that may be selected to may have CBG feedback. In some examples of the method, apparatus, and non-transitory computer-readable medium described above, the transmitting further comprises zero-padding any remaining resources of the resources available for transmitting feedback information following the feedback information.

In some examples of the method, apparatus, and non-transitory computer-readable medium described above, the identifying the two or more CCs that may be configured for either TB feedback or CBG feedback comprises receiving a configuration having a first ordered list that indicates a first plurality of CCs that may be configured at the UE and a second ordered list that indicates the two or more CCs as at least a subset of the first ordered list. In some examples of the method, apparatus, and non-transitory computer-readable medium described above, the transmitting comprises transmitting an index of which CC of the second ordered list may have CBG feedback included in the feedback information.

In some examples of the method, apparatus, and non-transitory computer-readable medium described above, the two or more CCs configured for either TB feedback or CBG feedback comprise a first number of CCs and the amount of feedback resources that support CBG feedback for a second number of CCs that may be less than the first number of CCs, and wherein the selecting comprises selecting the second number of CCs of the two or more CCs for CBG feedback and selecting the remaining CCs of the two or more CCs for TB feedback.

In some examples of the method, apparatus, and non-transitory computer-readable medium described above, the transmitting comprises transmitting a first index indicating a first CC of the second ordered list that may have CBG feedback included in the feedback information, transmitting a first bitmap indicating which CBGs of the first CC may be successfully and unsuccessfully received, transmitting a second index indicating a second CC of the second ordered list that may have CBG feedback included in the feedback information if resources may be available to accommodate the CBG feedback for the second CC, and transmitting a second bitmap indicating which CBGs of the second CC may be successfully and unsuccessfully received if resources may be available to accommodate the CBG feedback for the second CC.

In some examples of the method, apparatus, and non-transitory computer-readable medium described above, the transmitting comprises transmitting a CBG field that indicates the number of CCs with CBG feedback included in the feedback information, transmitting a first CC index and a first bitmap indicating which CBGs of a first CC indicated in the CBG field may be successfully and unsuccessfully received, and transmitting a second CC index and a second bitmap indicating which CBGs of a second CC indicated in the CBG field may be successfully and unsuccessfully received if resources may be available to accommodate the CBG feedback for the second CC.

In some examples of the method, apparatus, and non-transitory computer-readable medium described above, the transmitting comprises transmitting a CBG field that indicates the number of CCs with CBG feedback included in the feedback information, transmitting TB feedback for each CC of the first ordered list that may be not included in the CBG field, transmitting a first CC index and a first bitmap indicating which CBGs of a first CC indicated in the CBG field may be successfully and unsuccessfully received, and transmitting a second CC index and a second bitmap indicating which CBGs of a second CC indicated in the CBG field may be successfully and unsuccessfully received if resources may be available to accommodate the CBG feedback for the second CC.

A method of wireless communication is described. The method may include configuring a UE with a plurality of CCs and configuring two or more CCs of the plurality of CCs for either TB feedback or CBG feedback, allocating the UE with uplink resources for transmitting feedback information, transmitting data to the UE using the plurality of CCs, receiving the feedback information, and determining, for each CC of the two or more CCs, whether TB feedback or CBG feedback is included in the feedback information.

An apparatus for wireless communication is described. The apparatus may include means for configuring a UE with a plurality of CCs and configuring two or more CCs of the plurality of CCs for either TB feedback or CBG feedback, means for allocating the UE with uplink resources for transmitting feedback information, means for transmitting data to the UE using the plurality of CCs, means for receiving the feedback information, and means for determining, for each CC of the two or more CCs, whether TB feedback or CBG feedback is included in the feedback information.

Another apparatus for wireless communication is described. The apparatus may include a processor, memory in electronic communication with the processor, and instructions stored in the memory. The instructions may be operable to cause the processor to configure a UE with a plurality of CCs and configuring two or more CCs of the plurality of CCs for either TB feedback or CBG feedback, allocate the UE with uplink resources for transmitting feedback information, transmit data to the UE using the plurality of CCs, receive the feedback information, and determine, for each CC of the two or more CCs, whether TB feedback or CBG feedback is included in the feedback information.

A non-transitory computer readable medium for wireless communication is described. The non-transitory computer-readable medium may include instructions operable to cause a processor to configure a UE with a plurality of CCs and configuring two or more CCs of the plurality of CCs for either TB feedback or CBG feedback, allocate the UE with uplink resources for transmitting feedback information, transmit data to the UE using the plurality of CCs, receive the feedback information, and determine, for each CC of the two or more CCs, whether TB feedback or CBG feedback is included in the feedback information.

In some examples of the method, apparatus, and non-transitory computer-readable medium described above, the determining comprises identifying a CC index within the feedback information that indicates which of the two or more CCs may have CBG feedback. In some examples of the method, apparatus, and non-transitory computer-readable medium described above, the feedback information comprises CBG feedback that includes a bitmap indicating which CBGs of an associated CC may be successfully and unsuccessfully received. In some examples of the method, apparatus, and non-transitory computer-readable medium described above, the feedback information further comprises TB feedback for each CC. In some examples of the method, apparatus, and non-transitory computer-readable medium described above, the feedback information further comprises TB feedback for each CC for which CBG feedback may be not provided.

In some examples of the method, apparatus, and non-transitory computer-readable medium described above, the configuring further comprises transmitting configuration information having a first ordered list that indicates a first plurality of CCs that may be configured at the UE and a second ordered list that indicates the two or more CCs as at least a subset of the first ordered list. In some examples of the method, apparatus, and non-transitory computer-readable medium described above, the determining comprises identifying an index within the feedback information that indicates which CC of the second ordered list may have CBG feedback.

A method of wireless communication is described. The method may include identifying, at a UE, two or more transmission time intervals (TTIs) that are configured for either TB feedback or CBG feedback for indicating successful or unsuccessful receipt of data in each TTI, identifying an amount of resources available for transmitting feedback information, selecting TB feedback or CBG feedback for each of the two or more TTIs based at least in part on the amount of resources available for transmitting feedback information, and transmitting the feedback information to a base station.

An apparatus for wireless communication is described. The apparatus may include means for identifying, at a UE, two or more TTIs that are configured for either TB feedback or CBG feedback for indicating successful or unsuccessful receipt of data in each TTI, means for identifying an amount of resources available for transmitting feedback information, means for selecting TB feedback or CBG feedback for each of the two or more TTIs based at least in part on the amount of resources available for transmitting feedback information, and means for transmitting the feedback information to a base station.

Another apparatus for wireless communication is described. The apparatus may include a processor, memory in electronic communication with the processor, and instructions stored in the memory. The instructions may be operable to cause the processor to identify, at a UE, two or more TTIs that are configured for either TB feedback or CBG feedback for indicating successful or unsuccessful receipt of data in each TTI, identify an amount of resources available for transmitting feedback information, select TB feedback or CBG feedback for each of the two or more TTIs based at least in part on the amount of resources available for transmitting feedback information, and transmit the feedback information to a base station.

A non-transitory computer readable medium for wireless communication is described. The non-transitory computer-readable medium may include instructions operable to cause a processor to identify, at a UE, two or more TTIs that are configured for either TB feedback or CBG feedback for indicating successful or unsuccessful receipt of data in each TTI, identify an amount of resources available for transmitting feedback information, select TB feedback or CBG feedback for each of the two or more TTIs based at least in part on the amount of resources available for transmitting feedback information, and transmit the feedback information to a base station.

In some examples of the method, apparatus, and non-transitory computer-readable medium described above, the selecting comprises determining a first number of TTIs for which CBG feedback can be supported based at least in part on the amount of resources available for transmitting feedback information, the first number of TTIs being less than a second number of TTIs that may be configured for either CBG feedback or TB feedback, and selecting at least a first TTI of the two or more TTIs for CBG feedback and at least a second TTI of the two or more TTIs for TB feedback.

In some examples of the method, apparatus, and non-transitory computer-readable medium described above, the first TTI and the second TTI may be selected for CBG feedback and TB feedback, respectively, based at least in part on an error pattern associated with each TTI. In some examples of the method, apparatus, and non-transitory computer-readable medium described above, the error pattern comprises one or more of a bursty interference error pattern or an error rate of each TTI. In some examples of the method, apparatus, and non-transitory computer-readable medium described above, the transmitting comprises transmitting an indication of which of the two or more TTIs may have CBG feedback, transmitting the CBG feedback for each TTI of the two or more TTIs that may be selected to may have CBG feedback, and transmitting TB feedback for any remaining TTIs.

A method of wireless communication is described. The method may include configuring a UE to provide feedback for indicating successful or unsuccessful receipt of data in each of a plurality of TTIs and configuring two or more TTIs of the plurality of TTIs for either TB feedback or CBG feedback, allocating the UE with uplink resources for transmitting feedback information, receiving the feedback information indicating successful or unsuccessful receipt of data in each TTI, and determining, for each TTI of the two or more TTIs, whether TB feedback or CBG feedback is included in the feedback information.

An apparatus for wireless communication is described. The apparatus may include means for configuring a UE to provide feedback for indicating successful or unsuccessful receipt of data in each of a plurality of TTIs and configuring two or more TTIs of the plurality of TTIs for either TB feedback or CBG feedback, means for allocating the UE with uplink resources for transmitting feedback information, means for receiving the feedback information indicating successful or unsuccessful receipt of data in each TTI, and means for determining, for each TTI of the two or more TTIs, whether TB feedback or CBG feedback is included in the feedback information.

Another apparatus for wireless communication is described. The apparatus may include a processor, memory in electronic communication with the processor, and instructions stored in the memory. The instructions may be operable to cause the processor to configure a UE to provide feedback for indicating successful or unsuccessful receipt of data in each of a plurality of TTIs and configuring two or more TTIs of the plurality of TTIs for either TB feedback or CBG feedback, allocate the UE with uplink resources for transmitting feedback information, receive the feedback information indicating successful or unsuccessful receipt of data in each TTI, and determine, for each TTI of the two or more TTIs, whether TB feedback or CBG feedback is included in the feedback information.

A non-transitory computer readable medium for wireless communication is described. The non-transitory computer-readable medium may include instructions operable to cause a processor to configure a UE to provide feedback for indicating successful or unsuccessful receipt of data in each of a plurality of TTIs and configuring two or more TTIs of the plurality of TTIs for either TB feedback or CBG feedback, allocate the UE with uplink resources for transmitting feedback information, receive the feedback information indicating successful or unsuccessful receipt of data in each TTI, and determine, for each TTI of the two or more TTIs, whether TB feedback or CBG feedback is included in the feedback information.

In some examples of the method, apparatus, and non-transitory computer-readable medium described above, the determining comprises identifying a TTI index within the feedback information that indicates which of the two or more TTIs may have CBG feedback. In some examples of the method, apparatus, and non-transitory computer-readable medium described above, the feedback information comprises CBG feedback that includes a bitmap indicating which CBGs of an associated TTI may be successfully and unsuccessfully received.

DETAILED DESCRIPTION

Figure 1:
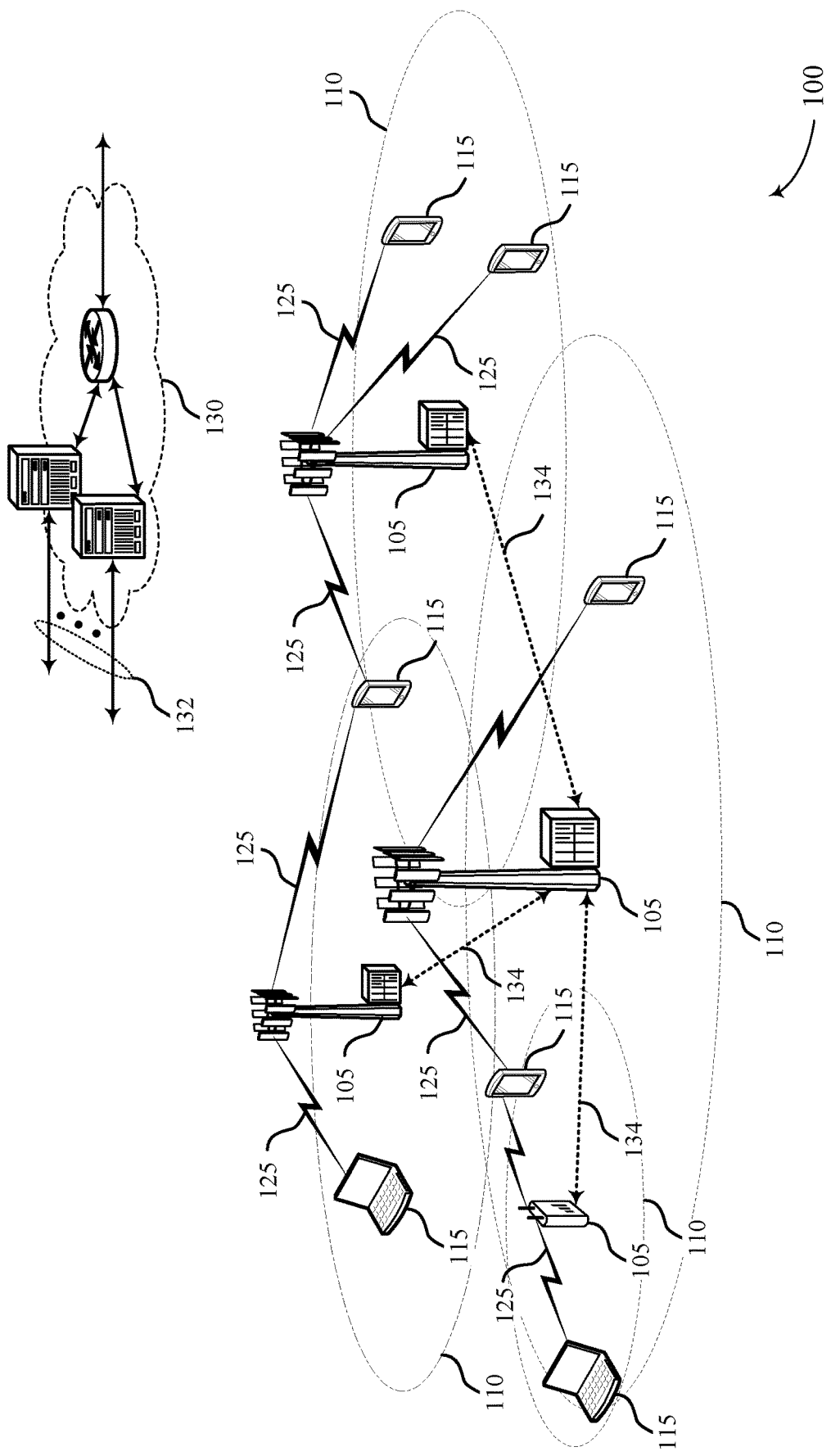
FIG. 1 illustrates an example of a system for wireless communication that supports CBG feedback techniques for multiple carriers or TTIs in accordance with aspects of the present disclosure.

The present disclosure relates to the selection of a feedback scheme in communication networks. In particular, the selection of the feedback scheme may be based at least in part on an amount of feedback information and available resources for transmitting the feedback information. In some wireless communications networks, a base station may configure a user equipment (UE) in a carrier aggregation (CA) mode, in which two or more component carriers (CCs) may be configured for downlink transmissions, uplink transmissions, or any combination thereof. Furthermore, a base station may configure uplink resources for feedback transmissions in which a UE may indicate whether downlink transmissions were successfully or unsuccessfully received, such as hybrid automatic repeat request (HARD) acknowledgment/negative-acknowledgment (ACK/NACK) information. In some cases, the one or more CCs may also be configured to provide feedback information with varying levels of granularity, such as providing feedback information at the less granular transport block (TB) level, or providing feedback information at a more granular code block group (CBG) level.

Because feedback at the CBG level is more granular, it can thus require more feedback resources than feedback at the TB level, and in some cases when a base station configures two or more CCs for CBG feedback, there may be insufficient feedback resources to provide all of the feedback. Various aspects of the present disclosure provide techniques for providing feedback for multiple CCs, or multiple transmission time intervals (TTIs), based on a feedback configuration and an amount of available feedback resources. In some cases, a UE receiving multiple CCs or transmissions in multiple TTIs that are to have feedback information provided in the feedback resources may select whether to use CBG feedback or TB feedback for one or more CCs or TTIs, based at least in part on, for example, an amount of feedback information to be transmitted, an amount of available feedback resources, an error pattern associated with one or more of the CCs or TTIs, or any combination thereof.

For example, a base station may configure a UE with two or more CCs, and then for particular downlink transmissions the base station may use all or a subset of the configured CCs. In one example, a base station may configure a UE with five CCs, but for a particular downlink transmission may use only three of the five configured CCs. The base station may also configure an amount of feedback resources, and configure each CC for CBG feedback or TB feedback. In some cases, if a CC is configured for TB feedback, a UE provides TB feedback, and if the CC is configured for CBG feedback, the UE may provide either CBG feedback or TB feedback. The UE may make such a selection based on a number of CCs that have feedback information for transmission, an amount of available feedback resources, an error pattern in the CCs, or any combination thereof. For example, if two CCs are configured for CBG feedback, but the feedback resources provide only sufficient resources for CBG feedback for one CC, the UE may decide which of the two CCs configured for CBG feedback is to use CBG feedback, with the other CC in such a case being selected for TB feedback. Various aspects of the disclosure provide feedback formats for transmission of feedback information that provide an indication of whether the UE selects CBG feedback or TB feedback for a CC. Techniques described herein may also be used in cases where feedback for multiple TTIs is to be provided in one TTI.

Aspects of the disclosure are initially described in the context of a wireless communications system. Aspects of the disclosure are further illustrated by and described with reference to apparatus diagrams, system diagrams, and flowcharts that relate to CBG feedback techniques for multiple carriers or TTIs.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices. One or more of the UEs 115 may be configured with multiple CCs or TTIs that have feedback information provided using uplink feedback resources of one CC or TTI, and such UEs 115 may select one or more CCs or TTIs for CBG feedback or TB feedback according to one or more techniques such as discussed herein.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between or among different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected CCs using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as CA or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for CA. CA may be used with both FDD and TDD CCs.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

As indicated above, in some cases a base station 105 may configure a UE 115 with two or more CCs, and may turn on or turn off individual CCs for a potential particular downlink transmission. For example, a base station 105 may configure a UE 115 with five CCs, but may activate only three of the five configured CCs. Out of the three activated CCs, the base station 105 may or may not transmit downlink data to UE based on the scheduling decision. UE only needs to provide UL A/N feedback with respect to the activated CCs. If UE is not scheduled on a CC on the activated CCs, UE may feedback NACK for that particular CC. The base station 105 may also configure an amount of feedback resources, and configure each CC for CBG feedback or TB feedback. In some cases, if a CC is configured for TB feedback, a UE 115 provides TB feedback, and if the CC is configured for CBG feedback, the UE 115 may provide either CBG feedback or TB feedback. The UE 115 may make a selection to use CBG feedback or TB feedback for a CC based on a number of CCs that have feedback information for transmission, an amount of available feedback resources, an error pattern in the CCs, or any combination thereof. For example, if two CCs are configured for CBG feedback, but the feedback resources provide only sufficient resources for CBG feedback for one CC, the UE 115 may decide which of the two CCs configured for CBG feedback is to use CBG feedback, with the other CC in such a case being selected for TB feedback.

Figure 2:
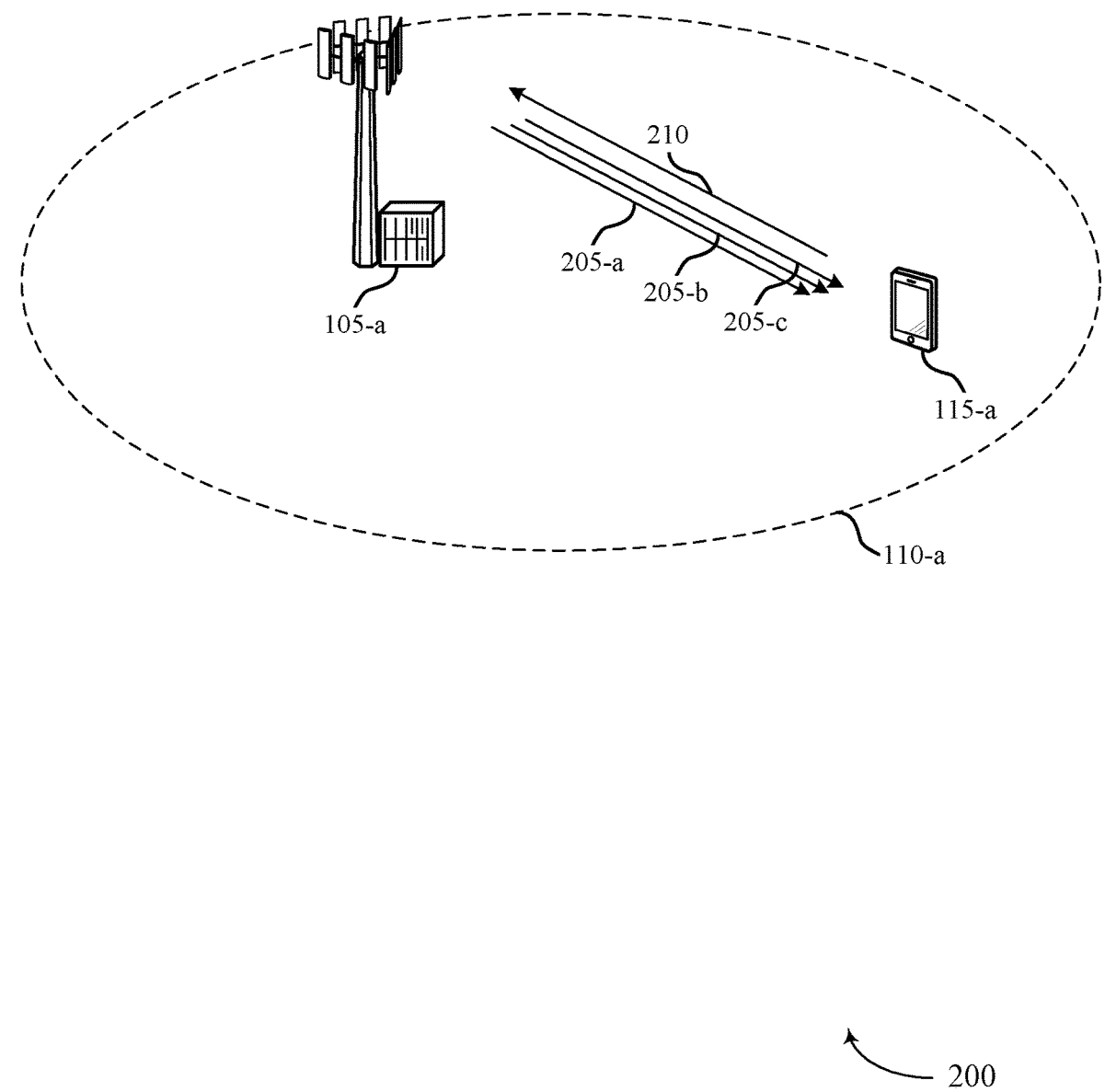
FIG. 2 illustrates an example of a wireless communication system that supports CBG feedback techniques for multiple carriers or TTIs in accordance with aspects of the present disclosure.

FIG. 2 illustrates an example of a wireless communication system 200 that supports CBG feedback techniques for multiple carriers or TTIs in accordance with various aspects of the present disclosure. In some examples, wireless communication system 200 may implement aspects of wireless communication system 100. Wireless communication system 200 includes base station 105-a and UE 115-a, which may be examples of aspects of a base station 105 and a UE 115 as described above with reference to FIG. 1. In the example of FIG. 2, the wireless communication system 200 may operate according to a radio access technology (RAT) such as an LTE, a 5G or NR RAT, although techniques described herein may be applied to any RAT and to systems that may concurrently use two or more different RATs.

Base station 105-a may communicate with UE 115-a over downlink CCs 205 and an uplink carrier 210. In some examples, CA may be used for transmissions, with separate CCs, such as a first downlink component carrier 205-a, a second downlink component carrier 205-b, and a third downlink component carrier 205-c. In some examples, base station 105-a may allocate feedback resources on uplink carrier 210 that may be used by the UE 115-a to transmit feedback information such as HARQ ACK/NACK information associated with downlink transmissions (e.g., physical downlink shared channel (PDSCH) transmissions) transmitted on the downlink CCs 205. As indicated above, in some cases the base station 105-a may configure one or more of the downlink CCs 205 for CBG level feedback, and may configure one or more of the downlink CCs 205 for TB level feedback. In some cases, the base station 105-a may configure downlink CCs 205 for CBG or TB feedback through radio resource control (RRC) signaling, and may configure a total number of bits for feedback of all of the downlink CCs 205.

In some cases, the base station 105-a may configure a number of downlink CCs 205 through RRC signaling, and may dynamically turn on/off one or more of the downlink CCs 205 through a MAC control element (MAC-CE) for a particular TTI. Thus, depending upon the downlink CCs 205 that are turned on or off in a TTI, the number of downlink CCs 205 having feedback information to transmit may be different. Furthermore, the amount of feedback information to be transmitted may vary depending upon whether the downlink CCs 205 are configured for TB or CBG feedback. In some cases, the base station 105-a may configure feedback resources that are at least able to accommodate TB feedback for each of the activated downlink CCs 205. In some cases, the base station 105-a may configure feedback resources that are able to accommodate TB feedback for each of the activated downlink CCs 205 as well as CBG feedback for one or more of the activated downlink CCs 205 in the event that one of more of the downlink CCs 205 are configured for CBG feedback.

After receiving downlink transmissions on the activated downlink CCs 205 or a subset of the activated downlink CCs 205, the UE 115-a may determine feedback information for the downlink CCs 205 that were activated for the downlink transmission. If one of the active downlink CCs 205 is configured for TB feedback, the UE 115-a will determine TB level feedback and report, for example, one ACK/NACK bit for the entire TB. If a downlink component carrier 205, such as first downlink component carrier 205-a, is configured for CBG feedback, the UE 115-a may either provide CBG level feedback in which one ACK/NACK bit may be provided for each CBG of a TB (e.g., in a bitmap associated with the CBGs of a TB), or the UE 115-a may select TB level feedback for the first downlink component carrier 205-a. If the available feedback resources do not have enough bits to provide CBG level feedback, the UE 115-a may use TB level feedback, for example. Thus, falling back to TB level feedback may provide a lossy compression scheme for reporting feedback. In the event that multiple downlink CCs 205, such as both first downlink component carrier 205-a and second downlink component carrier 205-b, are configured for CBG feedback but the feedback resources only have enough bits for CBG level feedback for one downlink component carrier 205, the UE 115-a may select which of the downlink CCs 205 for which to provide CBG feedback.

In some cases, the UE 115-a may evaluate an error pattern of each of the downlink CCs 205 configured for CBG feedback and select the type of feedback that will be more efficient for retransmission of data. For example, if the first downlink component carrier 205-a has a bursty error pattern where a relatively small number of CBGs need retransmission, and the second downlink component carrier 205-b has a more uniform error pattern across the entire TB, it may be more efficient to retransmit the small number of CBGs of the first downlink component carrier 205-a and the entire TB of the second downlink component carrier 205-b, rather than vice-versa. Accordingly, CBG feedback may be more efficient for the first downlink component carrier 205-a while TB feedback may be more efficient for the second downlink component carrier 205-b in this instance. In other cases, the UE 115-a may select the downlink component carrier 205 for CBG feedback based on a percentage of CBGs that were not successfully received, and the downlink component carrier 205 with the lower error rate may be selected for CBG feedback. In still other cases, one of the downlink CCs 205 may have a priority, such as based on a service that is being provided (e.g., a more latency-sensitive service), and the UE 115-a may select CBG feedback for such a carrier ahead of CBG feedback for other downlink CCs 205 that have a lower priority (e.g., more latency insensitive services). Within the feedback information, the UE 115-a may indicate which downlink component carrier(s) 205 have CBG feedback, and may include the CBG feedback (e.g., a bitmap of ACK/NACK bits for the CBGs of the downlink component carrier) according to a format for providing feedback as will be discussed in more detail below. In still other cases, a UE may choose to send TB level feedback on a downlink component carrier configured for CBG feedback if the UE is not scheduled on that downlink component carrier.

Figure 3:
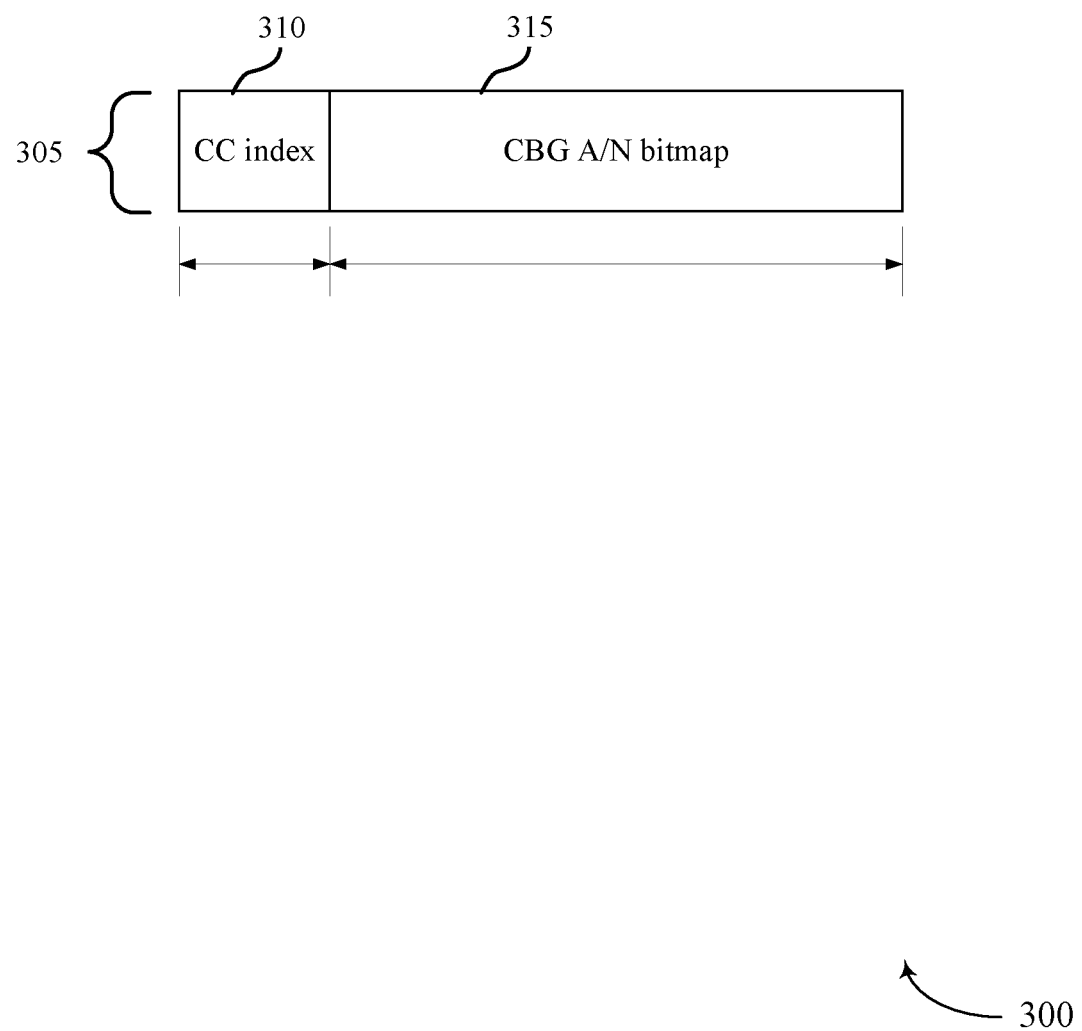
FIG. 3 illustrates an example of a feedback format that supports CBG feedback techniques for multiple carriers or TTIs in accordance with aspects of the present disclosure.

FIG. 3 illustrates an example of a feedback format 300 that supports CBG feedback techniques for multiple carriers or TTIs in accordance with various aspects of the present disclosure. In some examples, feedback format 300 may implement aspects of wireless communication system 100 or wireless communication system 200. The feedback format 300 may be used, in some examples, to provide CBG feedback for a CC.

Figure 4:
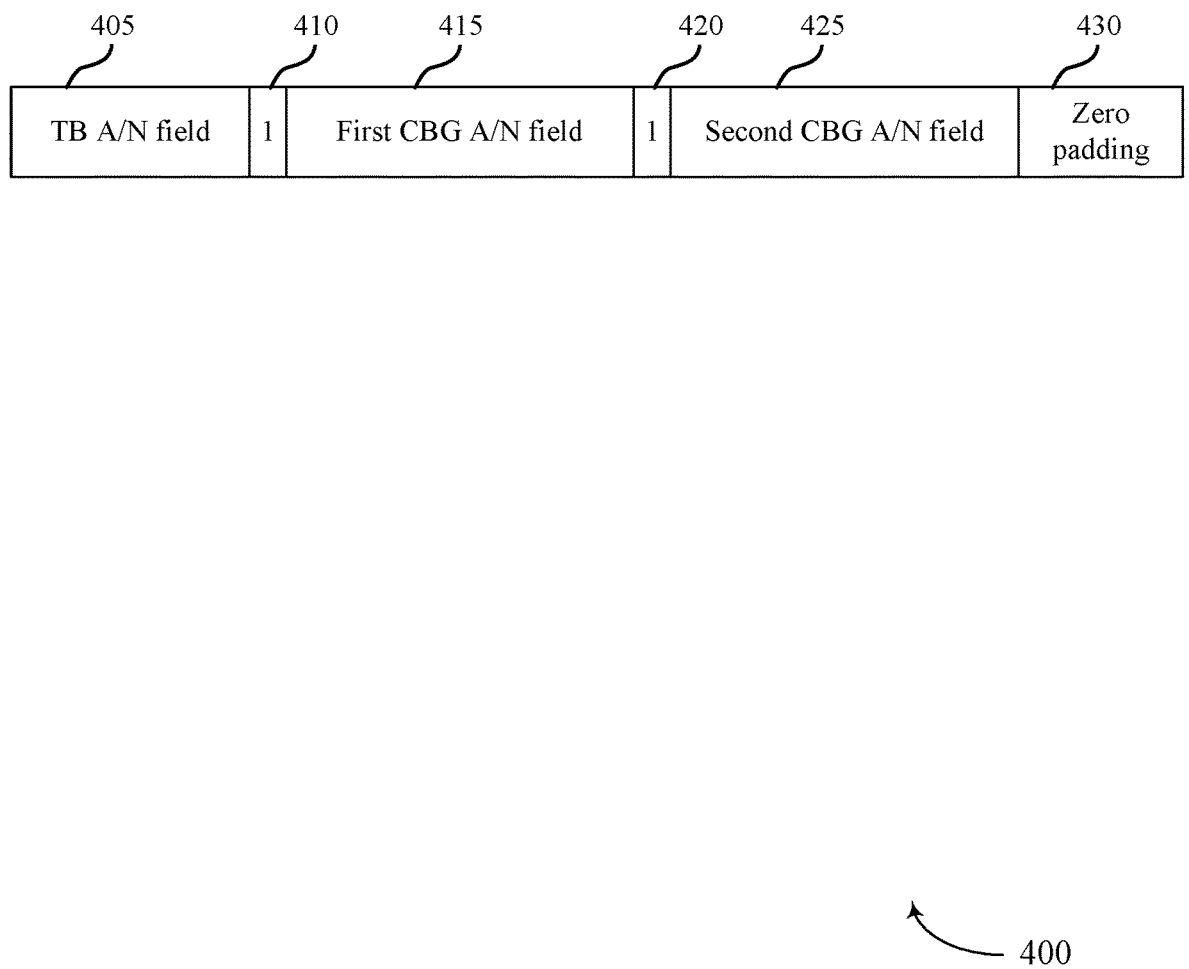
FIG. 4 illustrates an example of a feedback format that supports CBG feedback techniques for multiple carriers or TTIs in accordance with aspects of the present disclosure.
Figure 5:
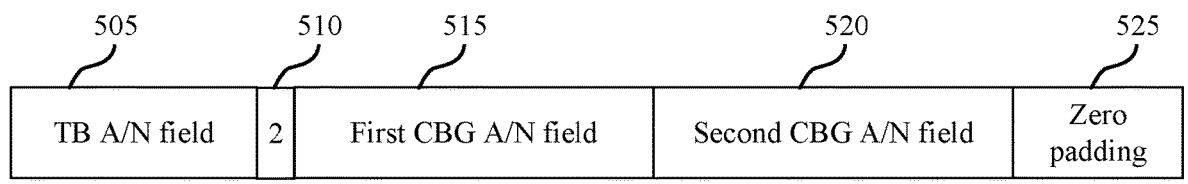
FIG. 5 illustrates an example of a feedback format that supports CBG feedback techniques for multiple carriers or TTIs in accordance with aspects of the present disclosure.
Figure 6:
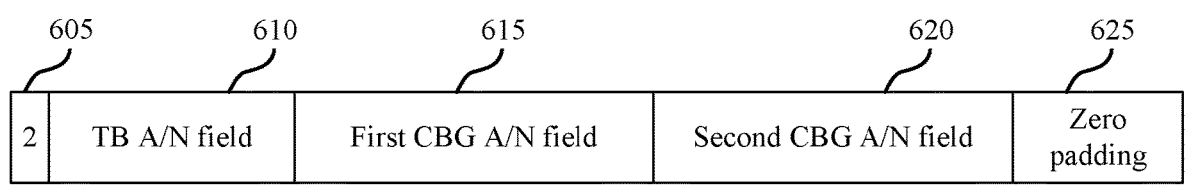
FIG. 6 illustrates an example of a feedback format that supports CBG feedback techniques for multiple carriers or TTIs in accordance with aspects of the present disclosure.

In this example, a CBG ACK/NACK field 305 may include an index field 310 that includes an index for the associated CC for which feedback is being provided, and a CBG ACK/NACK bitmap field 315 that includes a bit for each CBG configured in the CC. The length of the index field 310 depends upon the number of CCs turned on by the MAC-CE and that are configured to report CBG feedback. For example, if two CCs are configured for CBG feedback, the length of the index field 310 could be one bit, and if three CCs are configured for CBG feedback the length of the index field 310 could be two bits. In cases where only a single CC is configured for CBG feedback, the index field may be omitted. The length of the CBG ACK/NACK bitmap field 315 depends on the CC for which the CBG feedback is being reported and how many CBG ACK/NACK bits are configured for the CC. When identifying a CC by the index field 310, the UE and the base station are both aware of which CCs have been configured and activated at the UE, which may be included in an ordered list (A). Among these CCs, both the UE and the base station also are aware of which CCs are configured for CBG level feedback, which may be included in a second ordered list (B) that may be the same size or smaller than ordered list (A). In such cases, to indicate a CC with CBG feedback, a UE only needs to report the index within the second ordered list (B). The bitwidth also is known to both the UE and the base station, and the index of the CC within the list may be determined. In some cases, CBG level feedback may be carried for multiple CCs, if sufficient space in the feedback resources is available. In such cases, the CBG ACK/NACK field 305 may be sequentially concatenated for each CC for which feedback is being provided. FIGS. 4 through 6 provide a few examples of potential formats for feedback. Formats other than the examples provided herein will be readily apparent and within the scope of the present disclosure.

FIG. 4 illustrates an example of a feedback format 400 that supports CBG feedback techniques for multiple carriers or TTIs in accordance with various aspects of the present disclosure. In some examples, feedback format 400 may implement aspects of wireless communication system 100 or 200 of FIG. 1 or 2. The feedback format 400 may be used, in some examples, to provide TB feedback and CBG feedback for multiple configured CCs.

In this example, a TB ACK/NACK field 405 may be used to provide TB-level feedback for multiple CCs. In some cases, the TB ACK/NACK field 405 provides TB feedback for each CC that is configured and turned on (e.g., via MAC-CE) for a TTI. In some cases, the TB feedback is provided as a one-bit ACK/NACK for each CC and follows an order such as in ordered list (A) as discussed above. The length of the TB ACK/NACK field 405 may correspond to the number of CCs included in the ordered list (A), in such cases. Following the TB ACK/NACK field 405 is a first indicator field 410, which may be a one-bit indicator to signal that a CBG ACK/NACK field 415 follows. In some cases, the CBG ACK/NACK field 415 may have the format of CBG ACK/NACK field 305 as discussed above with respect to FIG. 3. A base station that receives the first indicator field 410 may determine that CBG feedback for a CC follows, and may determine the particular CC and feedback information by identifying information such as discussed with respect to FIG. 3.

In cases where sufficient resources are available in the feedback resources, CBG feedback for more than one CC may be provided, such as in the example of FIG. 4. In such cases, additional CBG feedback information may be sequentially concatenated, and a second indicator field 420 may be provided with a one-bit indicator to signal that a second CBG ACK/NACK field 425 follows. As discussed above, the second CBG ACK/NACK field 425 may have the format of CBG ACK/NACK field 305 as discussed above with respect to FIG. 3, and may be decoded by the base station to determine the CC index and CBG level feedback information for the CC. If no additional CCs are configured for CBG level feedback, or if sufficient resources are not available in the feedback resources, zero-padding 430 may be used to fill remaining feedback resources. A base station that receives a zero, in such examples, following a CBG ACK/NACK field may determine that no additional CBG feedback is being provided.

FIG. 5 illustrates another example of a feedback format 500 that supports CBG feedback techniques for multiple carriers or TTIs in accordance with various aspects of the present disclosure. In some examples, feedback format 500 may implement aspects of wireless communication system 100 or 200 of FIG. 1 or 2. The feedback format 500 may be used, in some examples, to provide TB feedback and CBG feedback for multiple configured CCs.

In this example, a TB ACK/NACK field 505 may be used to provide TB-level feedback for multiple CCs, similarly as with TB ACK/NACK field 405 of FIG. 4. In some cases, the TB ACK/NACK field 505 provides TB feedback for each CC that is configured and turned on (e.g., via MAC-CE) for a TTI. In some cases, the TB feedback is provided as a one-bit ACK/NACK for each CC and follows an order such as in ordered list (A) as discussed above. The length of the TB ACK/NACK field 505 may correspond to the number of CCs included in the ordered list (A), in such cases. Following the TB ACK/NACK field 505 is a CBG indicator field 510 that indicates a number of CCs for which CBG level feedback is being transmitted. The CBG indicator field 510 may indicate, for example, simply the number of CCs that have CBG feedback, or may indicate which CCs have CBG feedback (e.g., according to a mapping or index values of the CCs). A first CBG ACK/NACK field 515 follows the CBG indicator field 510 in this example, and may have the format of CBG ACK/NACK field 305 as discussed above with respect to FIG. 3. A base station that receives the CBG indicator field 510 may determine that CBG feedback for the identified number of CCs follows, and may determine the particular CC and feedback information by identifying information such as discussed with respect to FIG. 3.

In cases where sufficient resources are available in the feedback resources, CBG feedback for more than one CC may be provided, and additional CBG feedback information may be sequentially concatenated. Because the CBG indicator field 510 indicates the number of CCs with CBG feedback, a second CBG ACK/NACK field 520 may immediately follow the first CBG ACK/NACK field 515. As discussed above, the second CBG ACK/NACK field 520 may have the format of CBG ACK/NACK field 305 as discussed above with respect to FIG. 3, and may be decoded by the base station to determine the CC index and CBG level feedback information for the CC. If no additional CCs are configured for CBG level feedback, or if sufficient resources are not available in the feedback resources, zero-padding 525 may be used to fill remaining feedback resources.

FIG. 6 illustrates an example of a feedback format 600 that supports CBG feedback techniques for multiple carriers or TTIs in accordance with various aspects of the present disclosure. In some examples, feedback format 600 may implement aspects of wireless communication system 100 or 200 of FIG. 1 or 2. The feedback format 600 may be used, in some examples, to provide TB feedback and CBG feedback for multiple configured CCs. In the examples of FIGS. 4 and 5, TB feedback is provided for each CC regardless of whether the CC is configured for CBG feedback and whether CBG feedback is provided for the CC. Providing both TB feedback and CBG feedback may help provide additional information, such as related to cyclic redundancy check (CRC) errors at the TB level that may be indicated based on CBG feedback indicating that the CBGs are successfully received, for example. Alternatively, such as illustrated in the example of FIG. 6, the TB feedback can skip those CCs with CBG feedback to save some bits.

In the example of FIG. 6, a CBG indicator field 605 may be transmitted at the beginning of the feedback transmission. The CBG indicator field 605 may have a predefined length, and may indicate a number of CCs for which CBG level feedback is being transmitted. The CBG indicator field 605 may indicate, for example, simply the number of CCs that have CBG feedback, or may indicate which CCs have CBG feedback (e.g., according to a mapping or index values of the CCs). A TB ACK/NACK field 610 may follow the CBG indicator field 605, and may be used to provide TB-level feedback for CCs that do not have CBG feedback. The length of the TB ACK/NACK field 610 may correspond to the number of CCs that are turned on via MAC-CE and that do not have CBG feedback. The order of the TB feedback may correspond to the order of, for example, ordered list (A) with CCs that have CBG feedback being skipped.

A first CBG ACK/NACK field 615 follows the TB ACK/NACK field 610 in this example, and may have the format of CBG ACK/NACK field 305 as discussed above with respect to FIG. 3. A base station that receives the CBG indicator field 605 may determine the length of the TB ACK/NACK field 610, and may thus identify the starting position of the first CBG ACK/NACK field 615. In cases where sufficient resources are available in the feedback resources, CBG feedback for more than one CC may be provided, and additional CBG feedback information may be sequentially concatenated. Because the CBG indicator field 605 indicates the number of CCs with CBG feedback, a second CBG ACK/NACK field 620 may immediately follow the first CBG ACK/NACK field 615. As discussed above, the second CBG ACK/NACK field 620 may have the format of CBG ACK/NACK field 305 as discussed above with respect to FIG. 3, and may be decoded by the base station to determine the CC index and CBG level feedback information for the CC. If no additional CCs are configured for CBG level feedback, or if sufficient resources are not available in the feedback resources, zero-padding 625 may be used to fill remaining feedback resources. A base station may identify the CCs that have CBG feedback, and use that information to determine which CCs have TB feedback and the TB feedback for each of those CCs.

As indicated above, techniques such as discussed with respect to FIGS. 2 through 6 may be used in cases where feedback information is to be transmitted for two or more TTIs, in addition, or alternatively, to providing feedback information for multiple CCs. For example, in some cases a NR system may have different duration TTIs, and may thus have feedback timelines that result in a UE needing to provide feedback for multiple TTIs at a given uplink slot. In other examples, shared spectrum may be used for transmission, and a UE may need to provide feedback for multiple TTIs due to not obtaining channel access following a particular downlink transmission for transmission of feedback for that downlink transmission. In such cases, each TTI/HARQ interlace may or may not have individual CBG configuration. In some cases, the number of multiple TTIs that a UE needs to provide feedback for may be configured via RRC or MAC-CE. Additionally, feedback resources may also be configured that are at least equal to the number of TTIs for which a UE needs to provide feedback, based on TB feedback, at a given time In such cases, for a TTI/HARQ interlace configured to do TB feedback, only TB feedback will be reported by the UE. In cases where a TTI/HARQ interlace is configured for CBG feedback, the UE may select CBG feedback or TB feedback according to the techniques discussed herein. For example, if sufficient feedback resources are not available for CBG feedback for a TTI, the UE may provide TB feedback, as a lossy compression scheme. For multiple TTIs with CBG feedback configured, the UE may select CBG feedback for one or more TTIs or HARQ interlaces based on an error pattern or error rate comparison of the multiple TTIs. Within the feedback, the UE may indicate which TTI has CBG feedback, and only include CBG feedback bitmap for those TTIs, using one or more techniques such as discussed above.

Figure 7:
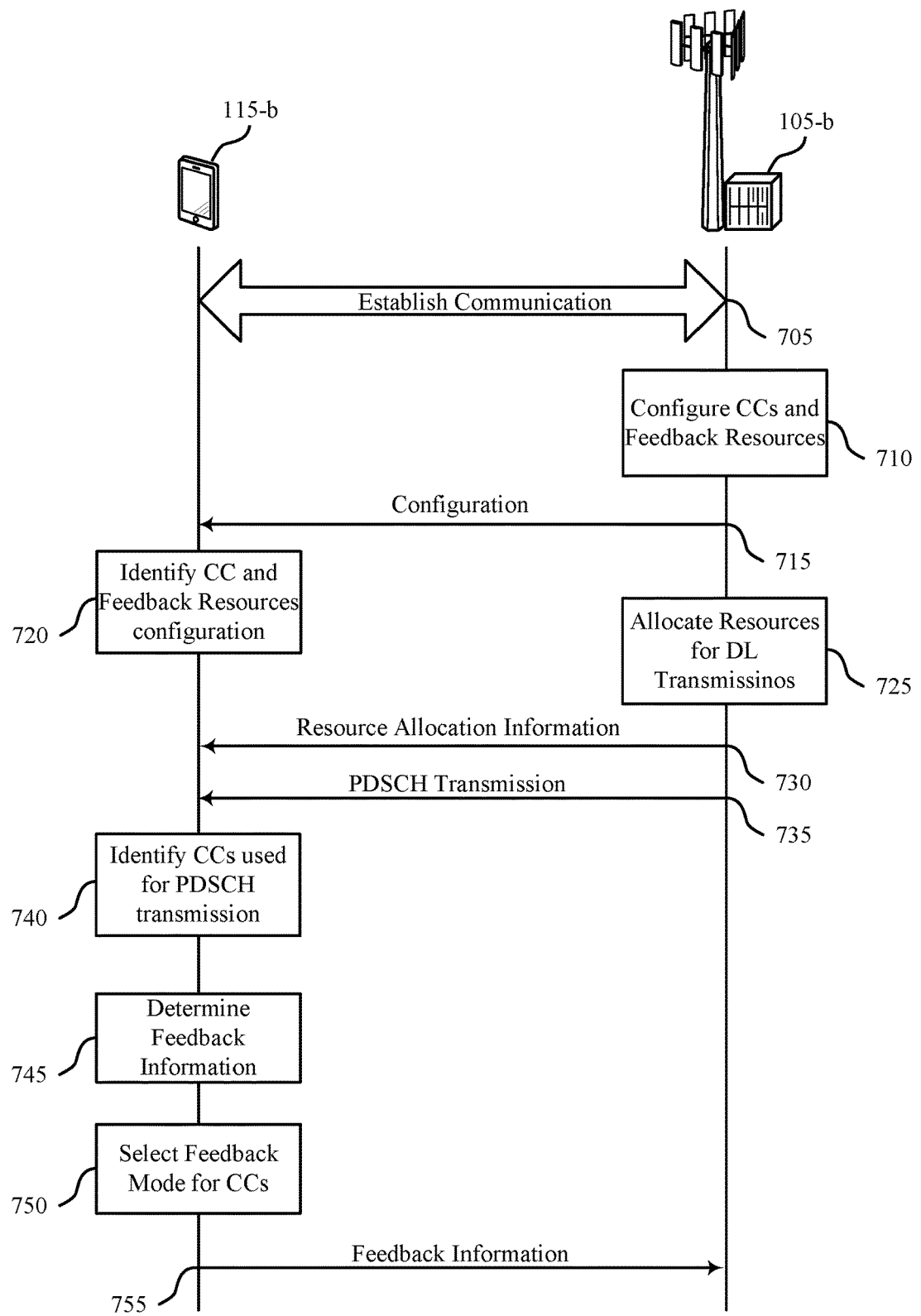
FIG. 7 illustrates an example of a process flow that supports CBG feedback techniques for multiple carriers or TTIs in accordance with aspects of the present disclosure.

FIG. 7 illustrates an example of a process flow 700 that supports CBG feedback techniques for multiple component carriers or TTIs in accordance with various aspects of the present disclosure. In some examples, process flow 700 may implement aspects of wireless communication systems 100 or 200. Process flow 700 may include a base station 105-*b*, and a UE 115-*b*, which may be examples of the corresponding devices described with reference to FIGS. 1-2. The base station 105-*b* and the UE 115-*b* may establish a connection 705 according to established connection establishment techniques for the wireless communications system.

At block 710, the base station 105-*b* may configure CCs and feedback resources for UE 115-*b*. The base station 105-*b* may configure multiple CCs according to CA capabilities of the UE 115-*b*, current traffic at the UE 115-*b* and network traffic, other UEs that may be served by the base station 105-*b*, and the like. Feedback resources may be configured according to a number of CCs that are configured, and based on how many of the CCs are configured for CBG feedback versus TB feedback. In cases where the CCs are configured for only TB feedback, the feedback resources may correspond to the number of configured CCs. In cases where two or more CCs are configured for CBG feedback, the base station 105-*b* may provide feedback resources that can accommodate CBG feedback for each CBG feedback configured CC, or may provide feedback resources that can accommodate CBG resources for less than the number of CCs configured for CBG feedback. In cases where feedback resources can accommodate CBG feedback for less than the number of CCs configured for CBG feedback, the UE 115-*b* and base station 105-*b* may operate according to techniques as discussed herein to provide feedback. The base station 105-*b* may transmit configuration information 715 to the UE 115-*b*, such as through RRC signaling.

At block 720, the UE 115-*b* may identify the configured CCs and the feedback resources. The UE 115-*b*, as part of the CC configuration, may also identify for each CC whether CBG feedback or TB feedback is configured for the CC.

At block 725, the base station 105-*b* may allocate resources for downlink transmissions on one or more of the configured CCs. Such a resource allocation may be made according to established resource allocation techniques, such as, for example, based on an amount of data to be transmitted to the UE 115-*b* and other traffic to be transmitted by the base station 105-*b*. The base station 105-*b* may transmit the resource allocation information 730 to the UE 115-*b*, which may include a MAC-CE that turns on/off one or more CCs at the UE for the potential downlink transmission. The base station 105-*b* may transmit the downlink transmission, such as PDSCH transmission 735 on the CCs or on a subset of the CCs that are activated for the transmission.

At block 740, the UE 115-*b* may identify the CCs that are turned on for the PDSCH transmission and receive the PDSCH transmission using those CCs. The UE 115-*b*, at block 745, may attempt to decode the downlink transmissions on the CCs used for the transmission, and may determine feedback information for each CC. For CCs that are configured for TB feedback, the UE 115-*b* may determine feedback information for each TB. For CCs that are configured for CBG feedback, the UE 115-*b* may determine feedback information for each configured CBG within a TB, as well as TB level feedback information.

At block 750, the UE 115-*b* may select the feedback mode for the CCs that are configured for CBG feedback. Such a selection may be made according to techniques as discussed herein for determining which CCs to transmit CBG feedback and which CCs to transmit TB feedback. The UE 115-*b* may then transmit the feedback information 755 to the base station 105-*b*, such as by using a feedback format as discussed above. The base station 105-*b* may receive the feedback information and determine the reported feedback, and format/transmit any necessary retransmissions based on the feedback information.

Figure 8:
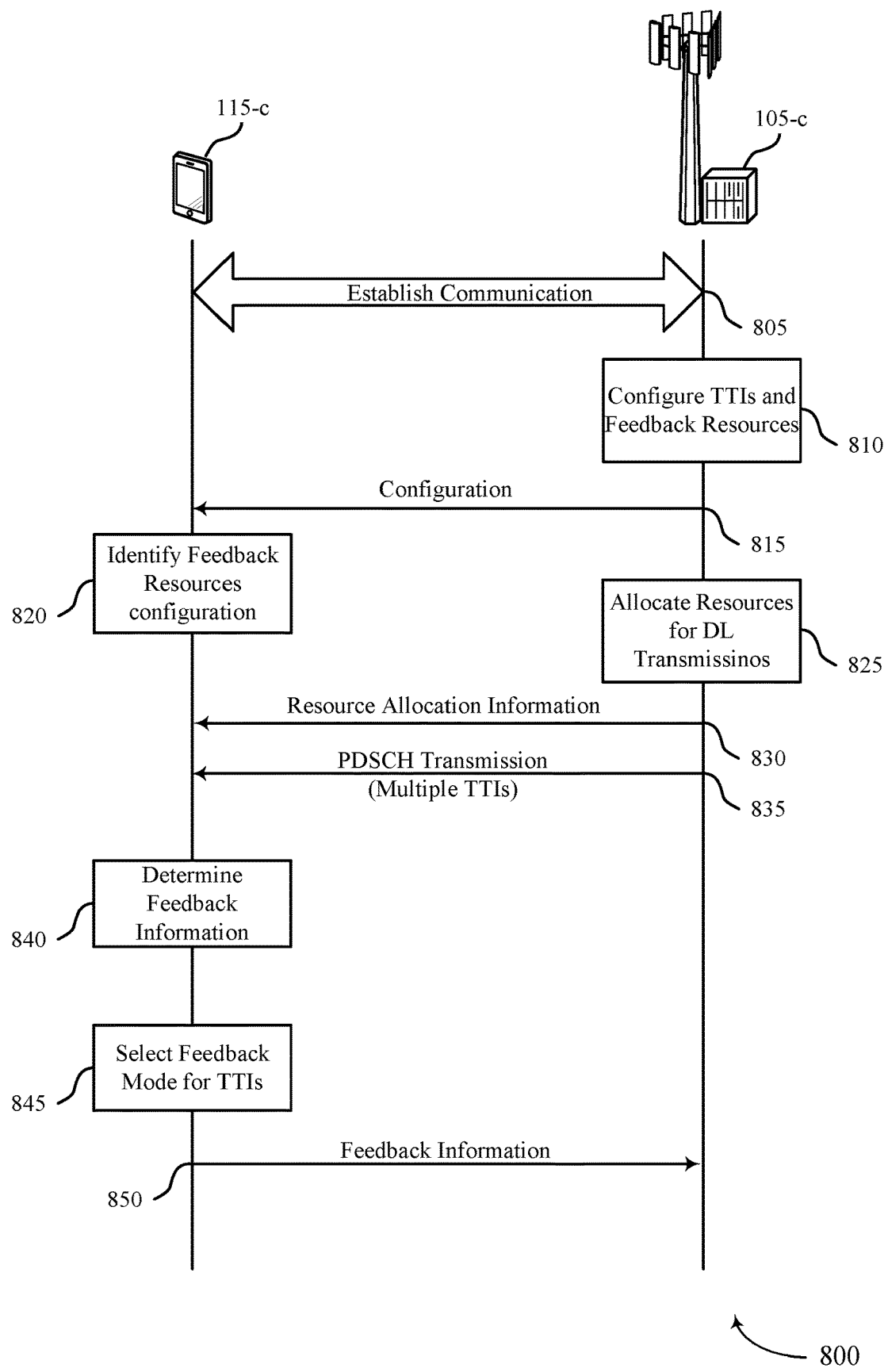
FIG. 8 illustrates an example of a process flow that supports CBG feedback techniques for multiple carriers or TTIs in accordance with aspects of the present disclosure.

FIG. 8 illustrates an example of a process flow 800 that supports CBG feedback techniques for multiple carriers or TTIs in accordance with various aspects of the present disclosure. In some examples, process flow 800 may implement aspects of wireless communication systems 100 or 200. Process flow 800 may include a base station 105-*c*, and a UE 115-*c*, which may be examples of the corresponding devices described with reference to FIGS. 1-2. The base station 105-*c* and the UE 115-*c* may establish a connection 805 according to established connection establishment techniques for the wireless communications system.

At block 810, the base station 105-*c* may configure TTIs and feedback resources for UE 115-*c*. The base station 105-*c* may configure multiple TTIs to report feedback in a single uplink TTI, based on a NR slot structure, for example. Feedback resources may be configured according to a number of TTIs and associated feedback that are configured, and based on how many of the TTIs are configured for CBG feedback versus TB feedback. In cases where the TTIs are configured for only TB feedback, the feedback resources may correspond to the number of configured TTIs. In cases where two or more TTIs are configured for CBG feedback, the base station 105-*c* may provide feedback resources that can accommodate CBG feedback for each CBG feedback configured TTI, or may provide feedback resources that can accommodate CBG resources for less than the number of TTIs configured for CBG feedback. In cases where feedback resources can accommodate CBG feedback for less than the number of TTIs configured for CBG feedback, the UE 115-*c* and base station 105-*c* may operate according to techniques as discussed herein to provide feedback. The base station 105-*c* may transmit configuration information 815 to the UE 115-*c*, such as through RRC signaling.

At block 820, the UE 115-*c* may identify the configured TTIs and the feedback resources. The UE 115-*c*, as part of the TTI configuration, may also identify for each TTI (or HARQ interlace) whether CBG feedback or TB feedback is configured.

At block 825, the base station 105-*c* may allocate resources for downlink transmissions in one or more of the configured TTIs. Such a resource allocation may be made according to established resource allocation techniques, such as, for example, based on an amount of data to be transmitted to the UE 115-*c* and other traffic to be transmitted by the base station 105-*c*. The base station 105-*c* may transmit the resource allocation information 830 to the UE 115-*c*. The base station 105-*c* may transmit the downlink transmission, such as PDSCH transmission 835 during two or more TTIs.

At block 840, the UE 115-*c*, may attempt to decode the downlink transmissions on the TTIs used for the transmission, and may determine feedback information for each TTI. For TTIs that are configured for TB feedback, the UE 115-*c* may determine feedback for each TB. For TTIs that are configured for CBG feedback, the UE 115-*c* may determine feedback for each configured CBG within a TB, as well as TB level feedback information.

At block 845, the UE 115-*c* may select the feedback mode for the TTIs that are configured for CBG feedback. Such a selection may be made according to techniques as discussed herein for determining which CCs, TTIs, or HARQ interlaces to transmit CBG feedback and to transmit TB feedback. The UE 115-*c* may then transmit the feedback information 850 to the base station 105-*c*, such as by using a feedback format as discussed above. The base station 105-*c* may receive the feedback information and determine the reported feedback, and format/transmit any necessary retransmissions based on the feedback information.

Figure 9:
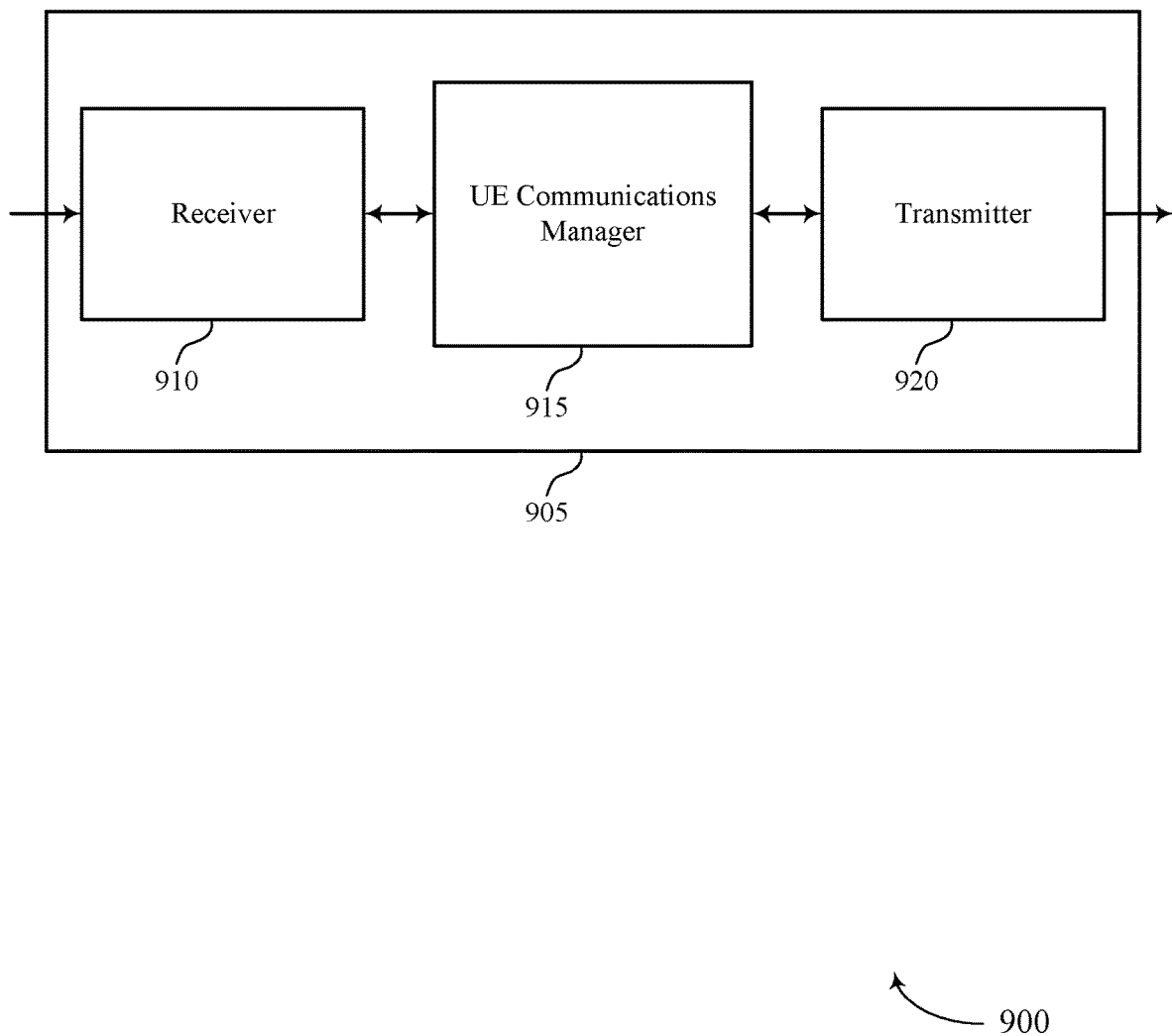
FIGS. 9 through 11 show block diagrams of a device that supports CBG feedback techniques for multiple carriers or TTIs in accordance with aspects of the present disclosure.

FIG. 9 shows a block diagram 900 of a wireless device 905 that supports CBG feedback techniques for multiple carriers or TTIs in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to CBG feedback techniques for multiple carriers or TTIs, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12. UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may identify, at a UE, two or more CCs that are configured for either TB feedback or CBG feedback (e.g., the TB feedback and the CBG feedback indicating successful or unsuccessful receipt of data in each CC), identify an amount of feedback resources available for transmitting feedback information, select TB feedback or CBG feedback for each of the two or more CCs based on the amount of feedback resources, and transmit the feedback information to a base station according to the selecting. The UE communications manager 915 may also identify, at a UE, two or more TTIs that are configured for either TB feedback or CBG feedback (e.g., for indicating successful or unsuccessful receipt of data in each TTI), identify an amount of resources available for transmitting feedback information, select TB feedback or CBG feedback for each of the two or more TTIs based on the amount of resources available for transmitting feedback information, and transmit the feedback information to a base station according to the selecting.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
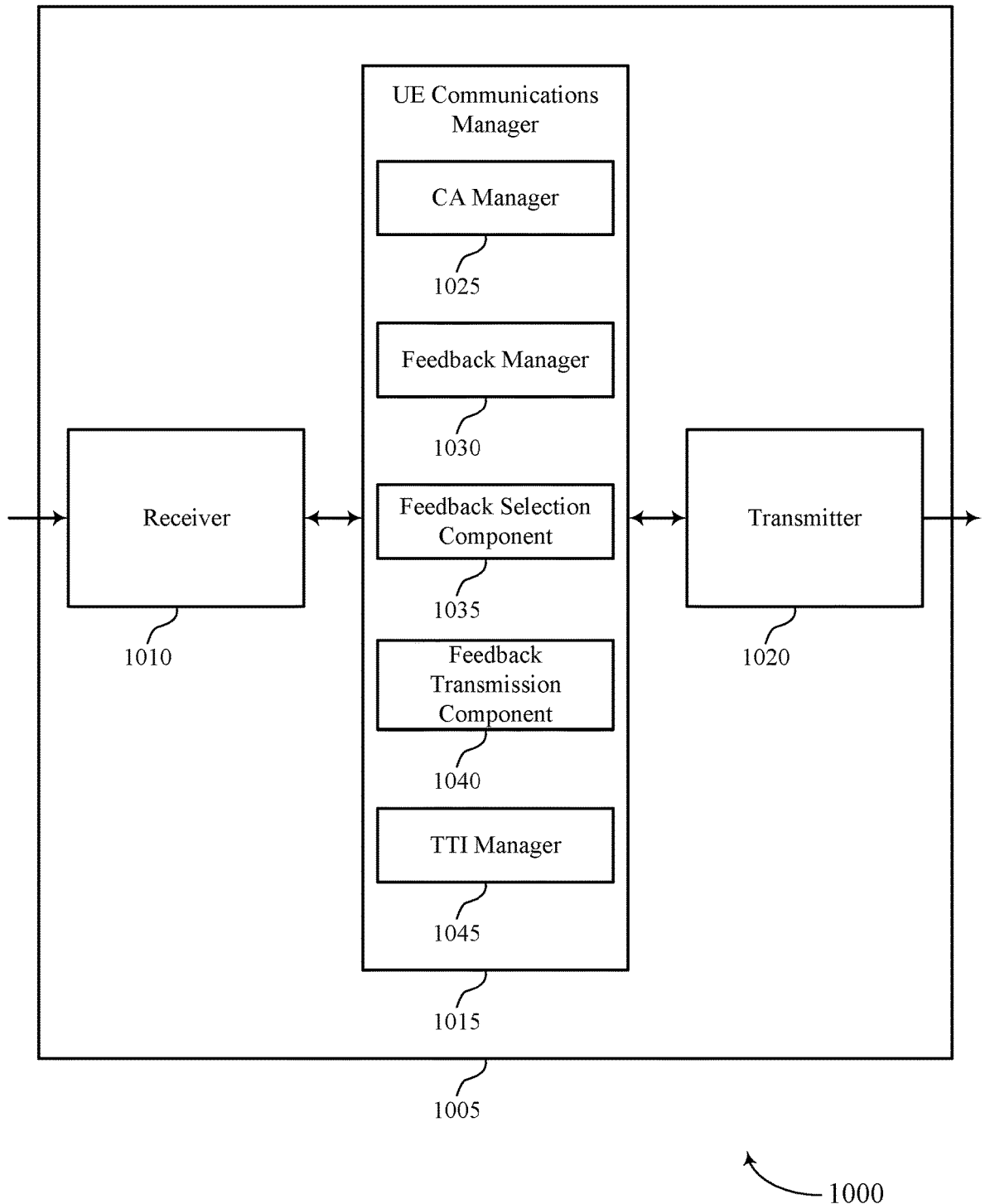

FIG. 10 shows a block diagram 1000 of a wireless device 1005 that supports CBG feedback techniques for multiple carriers or TTIs in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to CBG feedback techniques for multiple carriers or TTIs, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include CA manager 1025, feedback manager 1030, feedback selection component 1035, feedback transmission component 1040, and TTI manager 1045.

CA manager 1025 may identify, at a UE, two or more CCs that are configured for either TB feedback or CBG feedback, the TB feedback and the CBG feedback indicating successful or unsuccessful receipt of data in each CC.

Feedback manager 1030 may identify an amount of feedback resources available for transmitting feedback information and CCs for which different types of feedback are configured. In some cases, two or more CCs that are configured for either TB feedback or CBG feedback may be identified by receiving a configuration having a first ordered list that indicates a first set of CCs that are configured at the UE and a second ordered list that indicates the two or more CCs for TBG feedback as at least a subset of the first ordered list. In some cases, two or more CCs configured for either TB feedback or CBG feedback include a first number of CCs and the amount of feedback resources that support CBG feedback for a second number of CCs that is less than the first number of CCs, and a second number of CCs of the two or more CCs may be selected for CBG feedback, with the remaining CCs of the two or more CCs selected for TB feedback.

Feedback selection component 1035 may select TB feedback or CBG feedback for each of the two or more CCs (or TTIs) based on the amount of feedback resources available for transmitting feedback information. In some cases, the selecting includes determining a first number of CCs (or TTIs) for which CBG feedback can be supported based on the amount of feedback resources, the first number of CCs (or TTIs) being less than a second number of CCs (or TTIs) that are configured for either CBG feedback or TB feedback, and selecting at least a first CC (or TTI) of the two or more CCs for CBG feedback and at least a second CC (or TTI) of the two or more CCs (or TTIs) for TB feedback. In some cases, the first CC and the second CC (or the first TTI and the second TTI) are selected for CBG feedback and TB feedback, respectively, based on an error pattern associated with each CC (or each TTI).

Feedback transmission component 1040 may transmit the feedback information to a base station. In some cases, the transmitting includes transmitting an indication of which of the two or more CCs (or TTIs) have CBG feedback, transmitting the CBG feedback for each CC (or each TTI) of the two or more CCs that are selected to have CBG feedback, and transmitting TB feedback for any remaining CCs (or any remaining TTIs). In some cases, the transmitting includes transmitting TB feedback for each CC, transmitting an indication of which of the two or more CCs have CBG feedback, and transmitting the CBG feedback for each CC of the two or more CCs that are selected to have CBG feedback. In some cases, the transmitting further includes zero-padding any remaining resources of the resources available for transmitting feedback information following the feedback information. In some cases, the transmitting includes transmitting an indication of which of two or more TTIs have CBG feedback, transmitting the CBG feedback for each TTI of the two or more TTIs that are selected to have CBG feedback, and transmitting TB feedback for any remaining TTIs.

TTI manager 1045 may identify two or more TTIs that are configured for either TB feedback or CBG feedback for indicating successful or unsuccessful receipt of data in each TTI.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
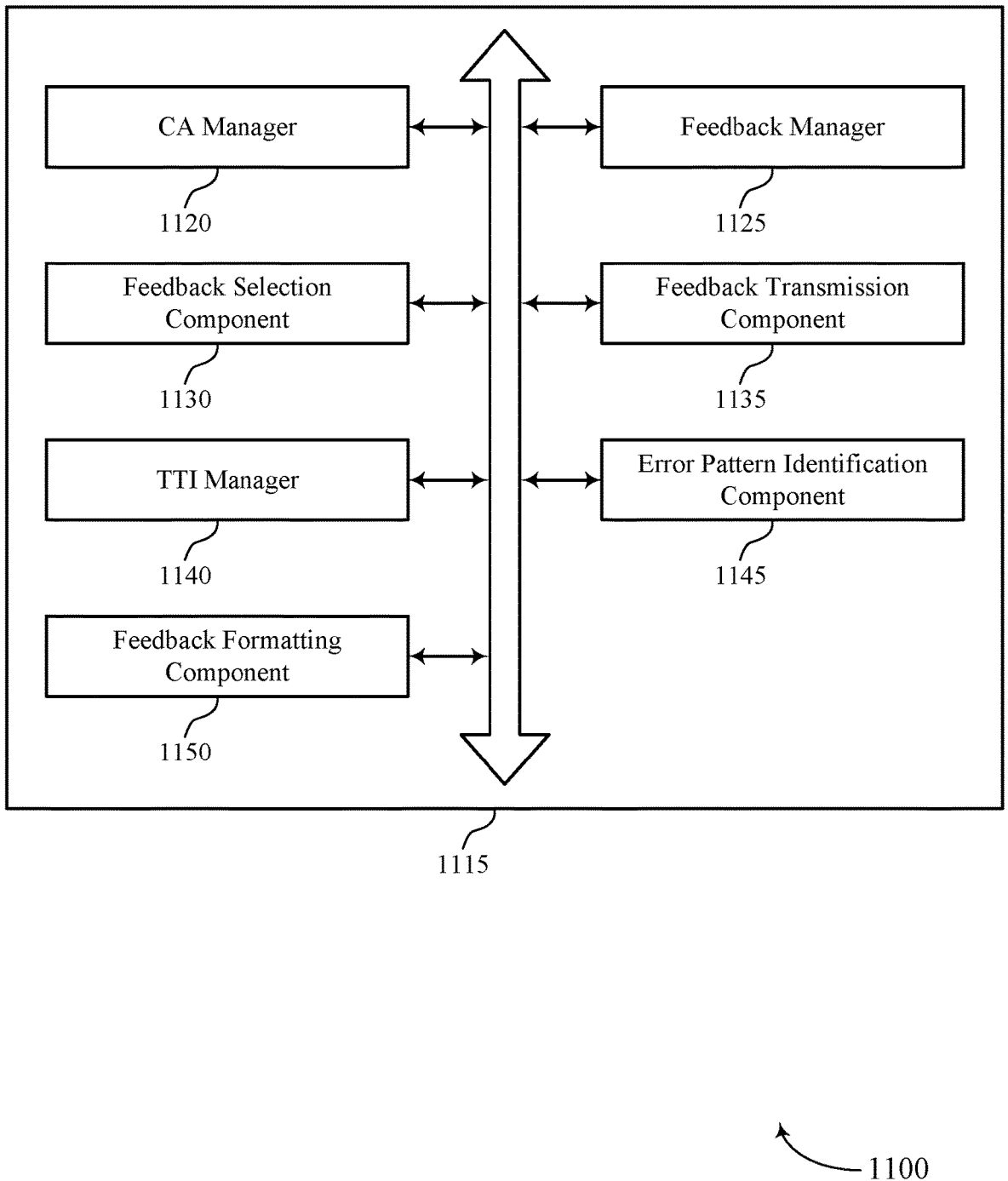

FIG. 11 shows a block diagram 1100 of a UE communications manager 1115 that supports CBG feedback techniques for multiple carriers or TTIs in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include CA manager 1120, feedback manager 1125, feedback selection component 1130, feedback transmission component 1135, TTI manager 1140, error pattern identification component 1145, and feedback formatting component 1150. Each of these modules may communicate, directly or indirectly, with one another (e.g., via one or more buses).

CA manager 1120 may identify two or more CCs that are configured for either TB feedback or CBG feedback, the TB feedback and the CBG feedback indicating successful or unsuccessful receipt of data in each CC.

Feedback manager 1125 may identify an amount of feedback resources available for transmitting feedback information and CCs for which different types of feedback are configured. In some cases, two or more CCs that are configured for either TB feedback or CBG feedback may be identified by receiving a configuration having a first ordered list that indicates a first set of CCs that are configured at the UE and a second ordered list that indicates the two or more CCs for TBG feedback as at least a subset of the first ordered list. In some cases, two or more CCs configured for either TB feedback or CBG feedback include a first number of CCs and the amount of feedback resources that support CBG feedback for a second number of CCs that is less than the first number of CCs, and a second number of CCs of the two or more CCs may be selected for CBG feedback, with the remaining CCs of the two or more CCs selected for TB feedback.

Feedback selection component 1130 may select TB feedback or CBG feedback for each of the two or more CCs (or TTIs) based on the amount of feedback resources available for transmitting feedback information. In some cases, the selecting includes determining a first number of CCs for which CBG feedback can be supported based on the amount of feedback resources, the first number of CCs being less than a second number of CCs that are configured for either CBG feedback or TB feedback, and selecting at least a first CC of the two or more CCs for CBG feedback and at least a second CC of the two or more CCs for TB feedback. In some cases, the first CC and the second CC are selected for CBG feedback and TB feedback, respectively, based on an error pattern associated with each CC.

Feedback transmission component 1135 may transmit the feedback information to a base station. In some cases, the transmitting includes transmitting an indication of which of the two or more CCs have CBG feedback, transmitting the CBG feedback for each CC of the two or more CCs that are selected to have CBG feedback, and transmitting TB feedback for any remaining CCs. In some cases, the transmitting includes transmitting TB feedback for each CC, transmitting an indication of which of the two or more CCs have CBG feedback, and transmitting the CBG feedback for each CC of the two or more CCs that are selected to have CBG feedback. In some cases, the transmitting further includes zero-padding any remaining resources of the resources available for transmitting feedback information following the feedback information. In some cases, the transmitting includes transmitting an indication of which of two or more TTIs have CBG feedback, transmitting the CBG feedback for each TTI of the two or more TTIs that are selected to have CBG feedback, and transmitting TB feedback for any remaining TTIs.

TTI manager 1140 may identify, at a UE, two or more TTIs that are configured for either TB feedback or CBG feedback for indicating successful or unsuccessful receipt of data in each TTI.

Error pattern identification component 1145 may, in some cases, identify that an error pattern includes one or more of a bursty interference error pattern, or identify an error rate of each CC. In some cases, CCs or TTIs are selected for CBG feedback and TB feedback based on an error pattern associated with each CC or TTI. In some cases, the error pattern includes one or more of a bursty interference error pattern or an error rate.

Feedback formatting component 1150 may format feedback for transmission to a base station. In some cases, an indication of which of two or more CCs have CBG feedback includes a CC index. In some cases, the CBG feedback includes a bitmap indicating which CBGs of an associated CC are successfully and unsuccessfully received. In some cases, the transmitting includes transmitting an indication of which of the two or more CCs have CBG feedback, transmitting the CBG feedback for each CC of the two or more CCs that are selected to have CBG feedback, and transmitting TB feedback for any remaining CCs. In some cases, the transmitting includes transmitting an index of which CC of the second ordered list has CBG feedback included in the feedback information. In some cases, the transmitting includes transmitting a first index indicating a first CC of the second ordered list that has CBG feedback included in the feedback information, transmitting a first bitmap indicating which CBGs of the first CC are successfully and unsuccessfully received, transmitting a second index indicating a second CC of the second ordered list that has CBG feedback included in the feedback information if resources are available to accommodate the CBG feedback for the second CC, and transmitting a second bitmap indicating which CBGs of the second CC are successfully and unsuccessfully received if resources are available to accommodate the CBG feedback for the second CC.

In some cases, the transmitting includes transmitting a CBG field that indicates the number of CCs with CBG feedback included in the feedback information, transmitting a first CC index and a first bitmap indicating which CBGs of a first CC indicated in the CBG field are successfully and unsuccessfully received, and transmitting a second CC index and a second bitmap indicating which CBGs of a second CC indicated in the CBG field are successfully and unsuccessfully received if resources are available to accommodate the CBG feedback for the second CC. In some cases, the transmitting includes transmitting a CBG field that indicates the number of CCs with CBG feedback included in the feedback information, transmitting TB feedback for each CC of the first ordered list that are not included in the CBG field, transmitting a first CC index and a first bitmap indicating which CBGs of a first CC indicated in the CBG field are successfully and unsuccessfully received, and transmitting a second CC index and a second bitmap indicating which CBGs of a second CC indicated in the CBG field are successfully and unsuccessfully received if resources are available to accommodate the CBG feedback for the second CC. In some cases, the selection of CCs or TTIs for CBG or TB feedback includes determining a first number of CCs or TTIs for which CBG feedback can be supported based on the amount of resources available for transmitting feedback information, the first number of CCs or TTIs being less than a second number of CCs or TTIs that are configured for either CBG feedback or TB feedback, and selecting at least a first CC or TTI for CBG feedback and at least a second CC or TTI for TB feedback.

Figure 12:
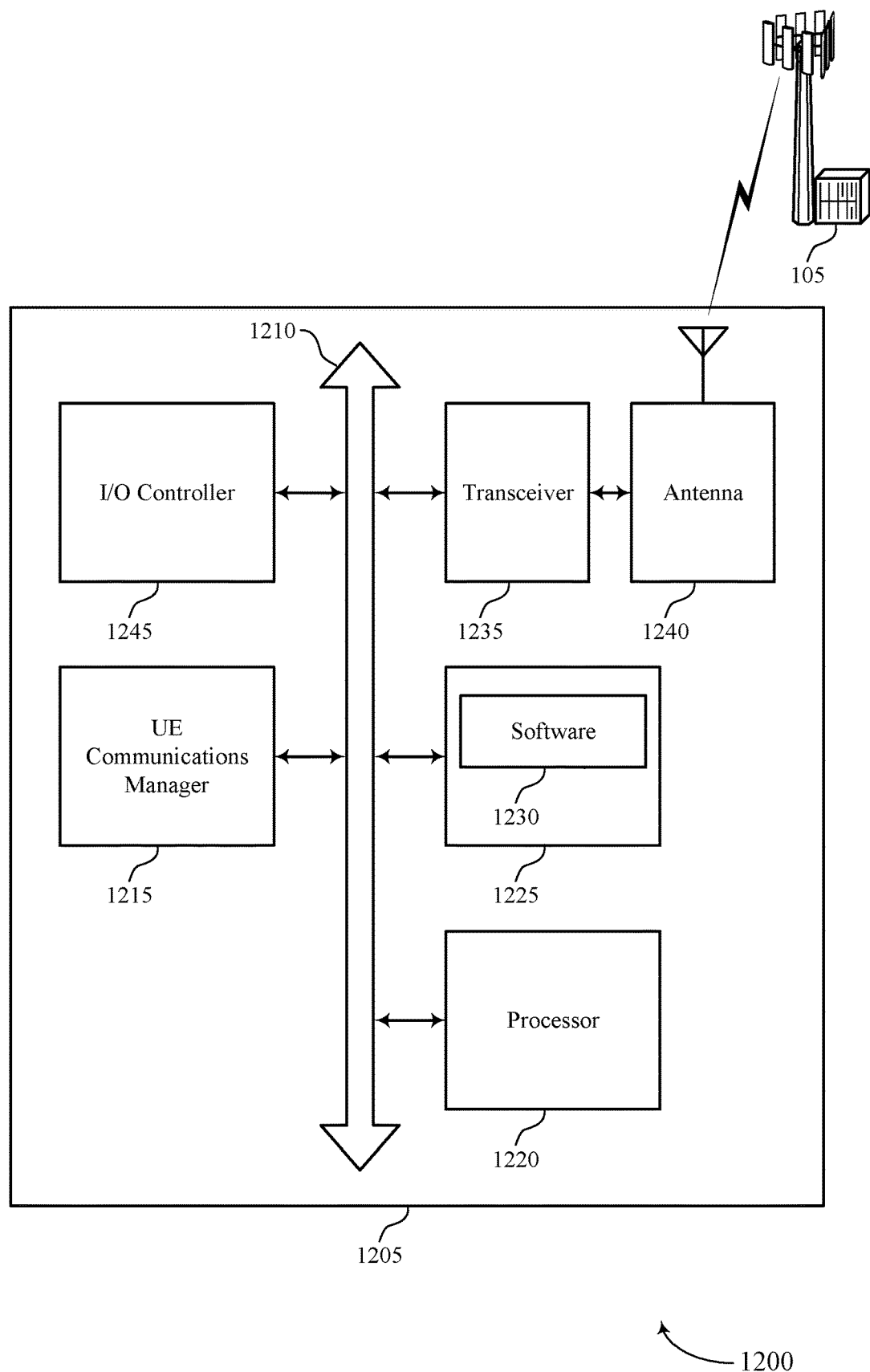
FIG. 12 illustrates a block diagram of a system including a UE that supports CBG feedback techniques for multiple carriers or TTIs in accordance with aspects of the present disclosure.

FIG. 12 shows a diagram of a system 1200 including a device 1205 that supports CBG feedback techniques for multiple carriers or TTIs in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting CBG feedback techniques for multiple carriers or TTIs).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support CBG feedback techniques for multiple carriers or TTIs. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
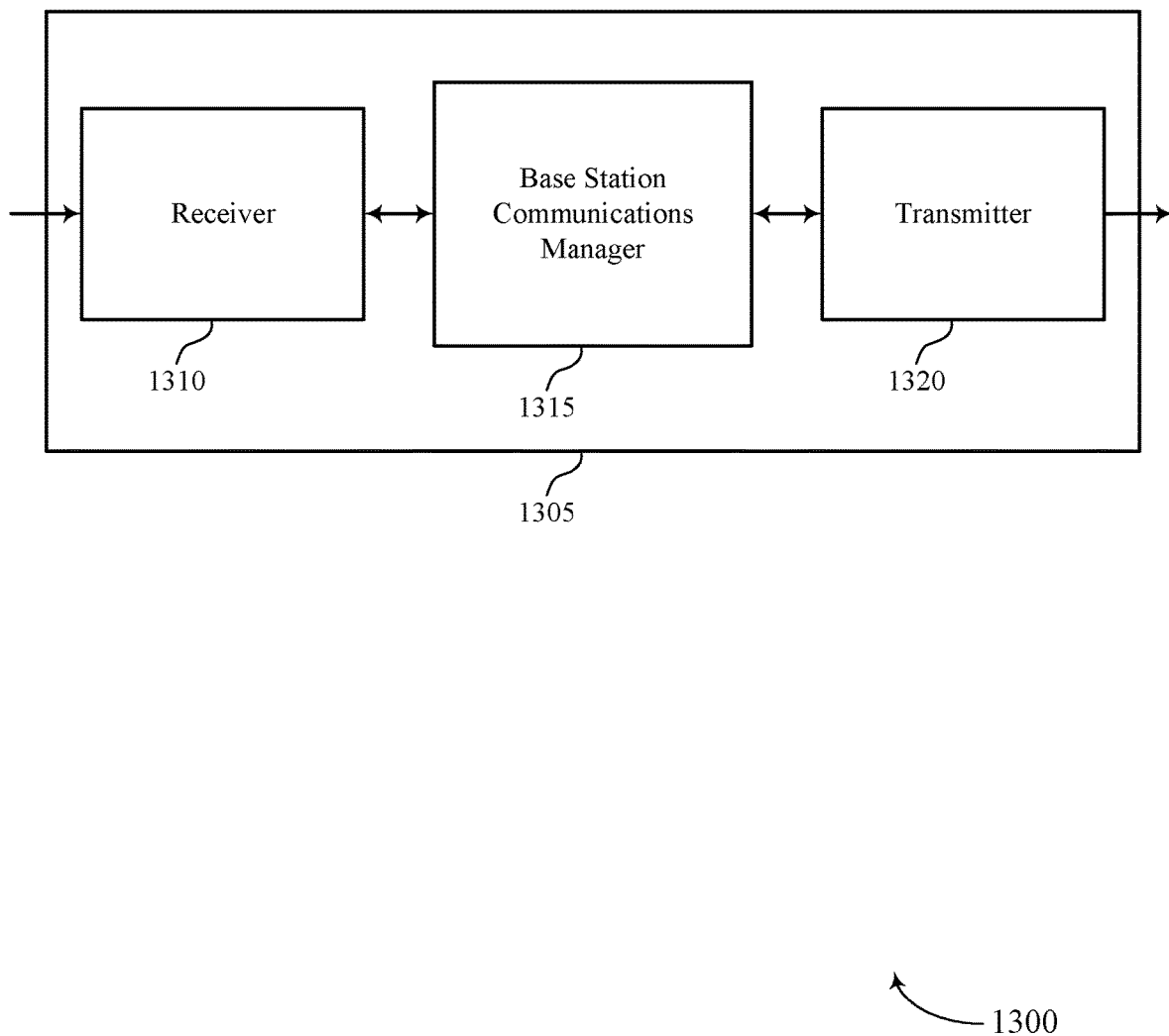
FIGS. 13 through 15 show block diagrams of a device that supports CBG feedback techniques for multiple carriers or TTIs in accordance with aspects of the present disclosure.

FIG. 13 shows a block diagram 1300 of a wireless device 1305 that supports CBG feedback techniques for multiple carriers or TTIs in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to CBG feedback techniques for multiple carriers or TTIs, etc.). Information may be passed on to other components of the device. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16.

Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may configure a UE with a set of CCs and configuring two or more CCs of the set of CCs for either TB feedback or CBG feedback (e.g., for indicating successful or unsuccessful receipt of data in each CC), allocate the UE with uplink resources for transmitting feedback information, transmit data to the UE using the set of CCs, receive the feedback information (e.g., indicating successful or unsuccessful receipt of data in each CC), and determine, for each CC of the two or more CCs, whether TB feedback or CBG feedback is included in the feedback information. The base station communications manager 1315 may also configure a UE to provide feedback (e.g., for indicating successful or unsuccessful receipt of data) in each of a set of TTIs and configuring two or more TTIs of the set of TTIs for either TB feedback or CBG feedback, allocate the UE with uplink resources for transmitting feedback information, receive the feedback information (e.g., indicating successful or unsuccessful receipt of data in each TTI), and determine, for each TTI of the two or more TTIs, whether TB feedback or CBG feedback is included in the feedback information.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
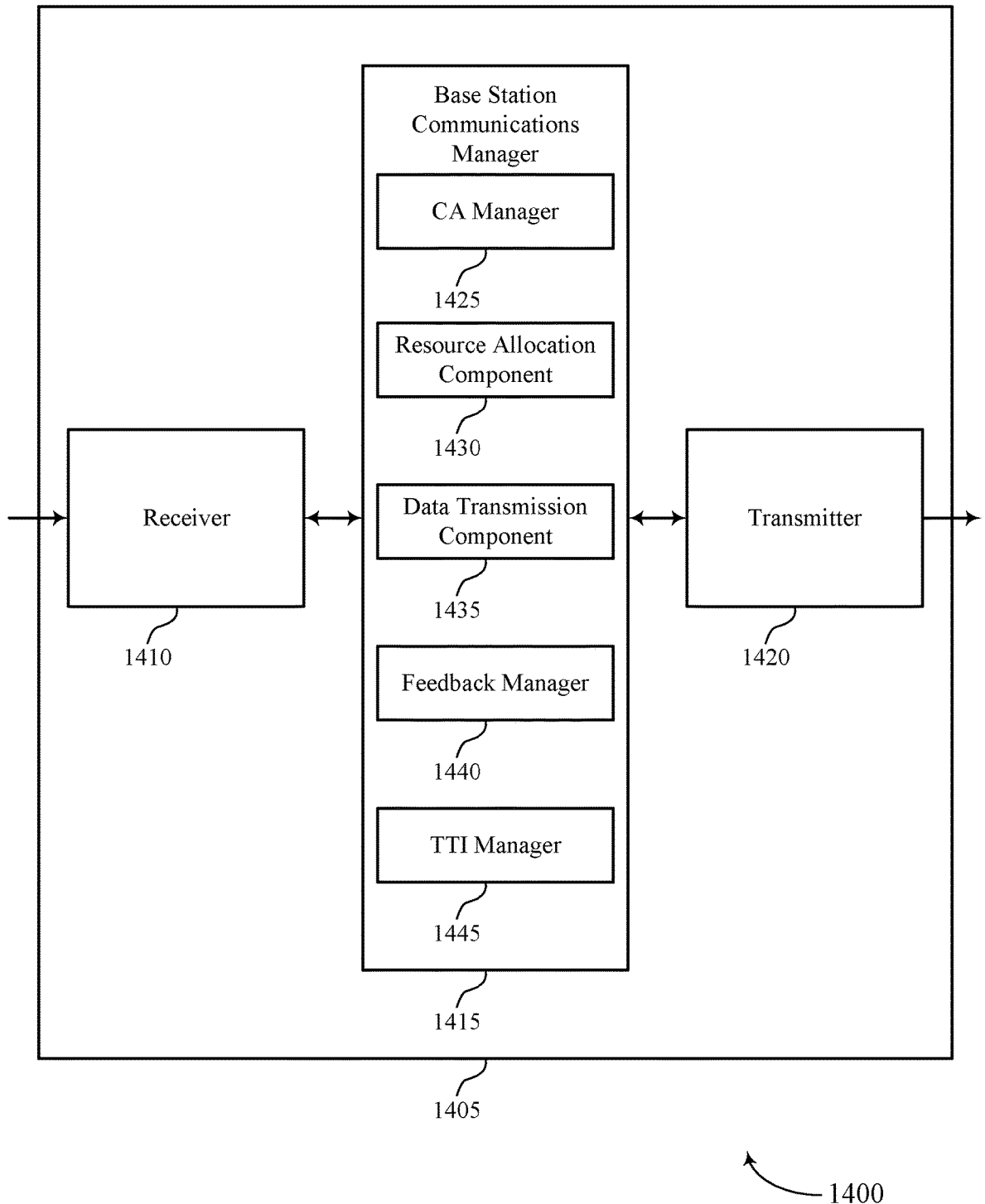

FIG. 14 shows a block diagram 1400 of a wireless device 1405 that supports CBG feedback techniques for multiple carriers or TTIs in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to CBG feedback techniques for multiple carriers or TTIs, etc.). Information may be passed on to other components of the device. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16. Base station communications manager 1415 may also include CA manager 1425, resource allocation component 1430, data transmission component 1435, feedback manager 1440, and TTI manager 1445.

CA manager 1425 may configure a UE with a set of CCs and configure two or more CCs of the set of CCs for either TB feedback or CBG feedback for indicating successful or unsuccessful receipt of data in each CC. In some cases, the configuring further includes transmitting configuration information having a first ordered list that indicates a first set of CCs that are configured at the UE and a second ordered list that indicates the two or more CCs as at least a subset of the first ordered list.

Resource allocation component 1430 may allocate the UE with uplink resources for transmitting feedback information. Data transmission component 1435 may transmit data to the UE using the set of CCs.

Feedback manager 1440 may receive the feedback information indicating successful or unsuccessful receipt of data in each CC, determine, for each CC of the two or more CCs, whether TB feedback or CBG feedback is included in the feedback information. In some cases, feedback manager 1440 may receive the feedback information indicating successful or unsuccessful receipt of data in each TTI, and determine, for each TTI of the two or more TTIs, whether TB feedback or CBG feedback is included in the feedback information. In some cases, the feedback information includes CBG feedback that includes a bitmap indicating which CBGs of an associated CC or TTI are successfully and unsuccessfully received. In some cases, the determining includes identifying a CC index within the feedback information that indicates which of the two or more CCs have CBG feedback. In some cases, the feedback information includes CBG feedback that includes a bitmap indicating which CBGs of an associated CC are successfully and unsuccessfully received. In some cases, the feedback information further includes TB feedback for each CC. In some cases, the determining includes identifying an index within the feedback information that indicates which CC of the second ordered list has CBG feedback. In some cases, the determining includes identifying a TTI index within the feedback information that indicates which of the two or more TTIs have CBG feedback. In some cases, the feedback information further includes TB feedback for each CC for which CBG feedback is not provided.

TTI manager 1445 may configure a UE to provide feedback for indicating successful or unsuccessful receipt of data in each of a set of TTIs and configuring two or more TTIs of the set of TTIs for either TB feedback or CBG feedback.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
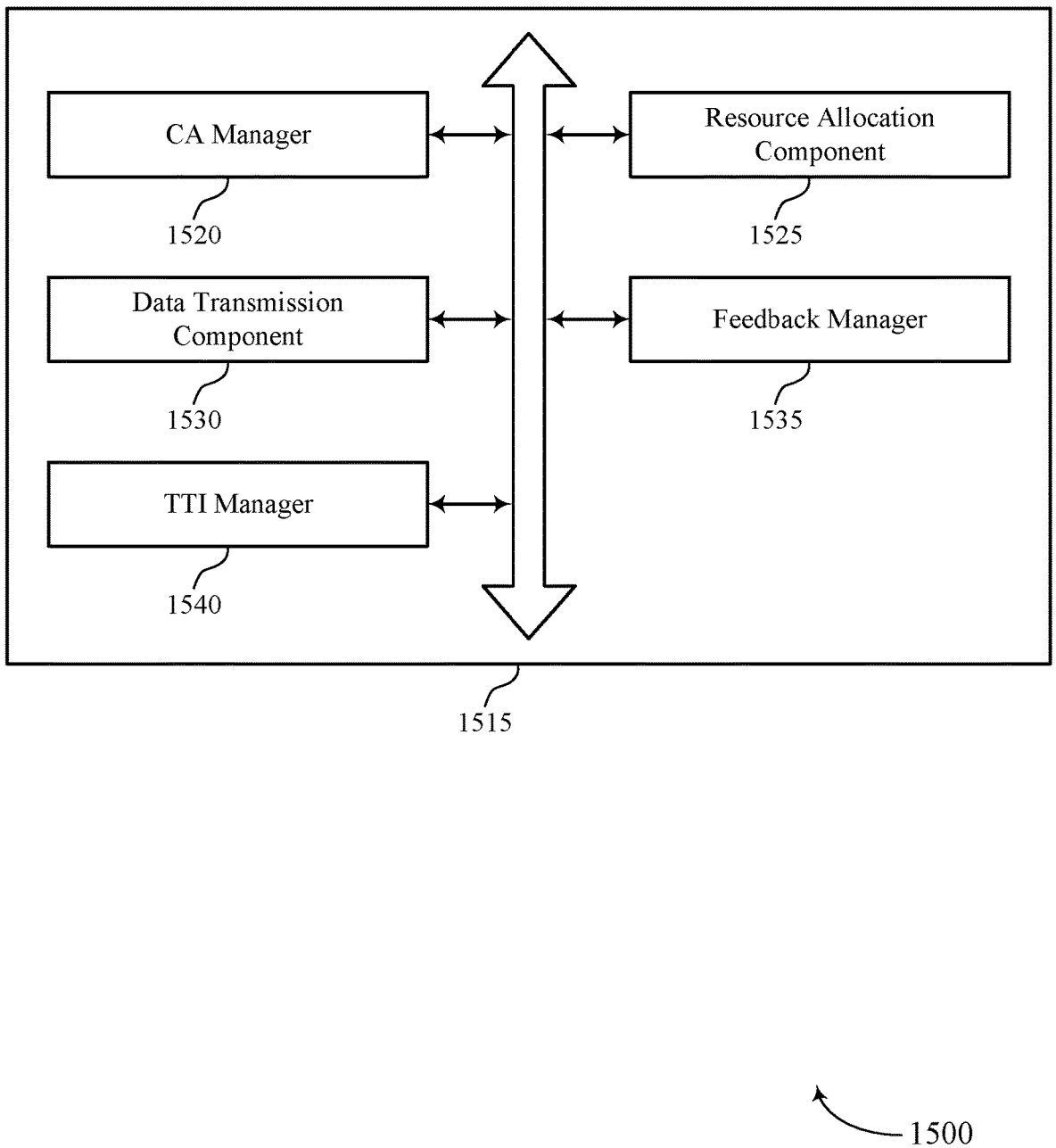

FIG. 15 shows a block diagram 1500 of a base station communications manager 1515 that supports CBG feedback techniques for multiple carriers or TTIs in accordance with aspects of the present disclosure. The base station communications manager 1515 may be an example of aspects of a base station communications manager 1615 described with reference to FIGS. 13, 14, and 16. The base station communications manager 1515 may include CA manager 1520, resource allocation component 1525, data transmission component 1530, feedback manager 1535, and TTI manager 1540. Each of these modules may communicate, directly or indirectly, with one another (e.g., via one or more buses).

CA manager 1520 may configure a UE with a set of CCs and configure two or more CCs of the set of CCs for either TB feedback or CBG feedback for indicating successful or unsuccessful receipt of data in each CC. In some cases, the configuring further includes transmitting configuration information having a first ordered list that indicates a first set of CCs that are configured at the UE and a second ordered list that indicates the two or more CCs as at least a subset of the first ordered list.

Resource allocation component 1525 may allocate the UE with uplink resources for transmitting feedback information. Data transmission component 1530 may transmit data to the UE using the set of CCs.

Feedback manager 1535 may receive the feedback information indicating successful or unsuccessful receipt of data in each CC, and determine, for each CC of the two or more CCs, whether TB feedback or CBG feedback is included in the feedback information. In some cases, feedback manager 1535 may receive the feedback information indicating successful or unsuccessful receipt of data in each TTI, and determine, for each TTI of the two or more TTIs, whether TB feedback or CBG feedback is included in the feedback information. In some cases, the feedback information includes CBG feedback that includes a bitmap indicating which CBGs of an associated CC or TTI are successfully and unsuccessfully received. In some cases, the determining includes identifying a CC index within the feedback information that indicates which of the two or more CCs have CBG feedback. In some cases, the feedback information includes CBG feedback that includes a bitmap indicating which CBGs of an associated CC are successfully and unsuccessfully received. In some cases, the feedback information further includes TB feedback for each CC. In some cases, the determining includes identifying an index within the feedback information that indicates which CC of the second ordered list has CBG feedback. In some cases, the determining includes identifying a TTI index within the feedback information that indicates which of the two or more TTIs have CBG feedback. In some cases, the feedback information further includes TB feedback for each CC for which CBG feedback is not provided.

TTI manager 1540 may configure a UE to provide feedback for indicating successful or unsuccessful receipt of data in each of a set of TTIs and configuring two or more TTIs of the set of TTIs for either TB feedback or CBG feedback.

Figure 16:
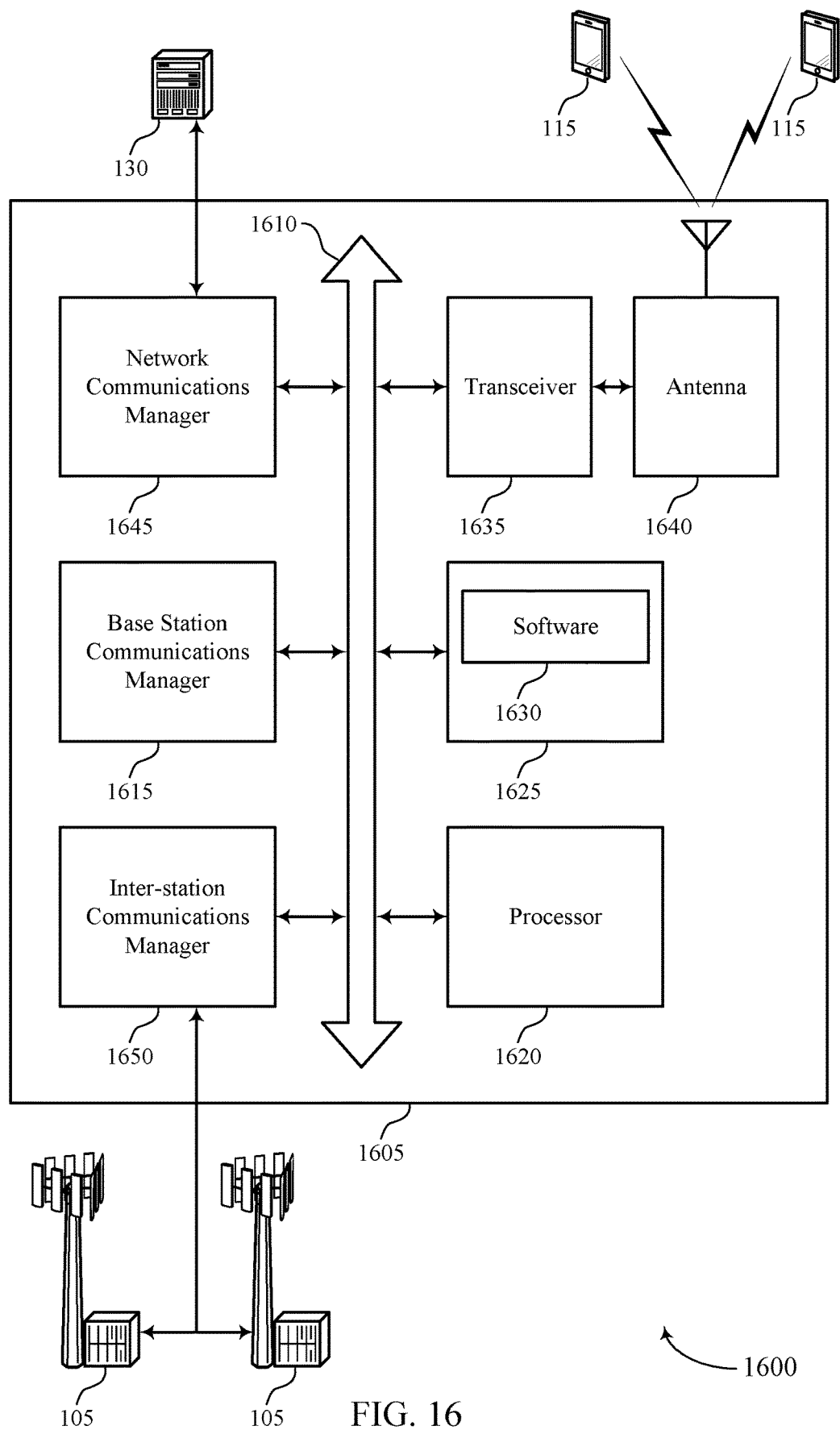
FIG. 16 illustrates a block diagram of a system including a base station that supports CBG feedback techniques for multiple carriers or TTIs in accordance with aspects of the present disclosure.

FIG. 16 shows a diagram of a system 1600 including a device 1605 that supports CBG feedback techniques for multiple carriers or TTIs in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting CBG feedback techniques for multiple carriers or TTIs).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support CBG feedback techniques for multiple carriers or TTIs. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base stations 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an LTE/LTE-A wireless communication network technology to provide communication between base stations 105.

Figure 17:
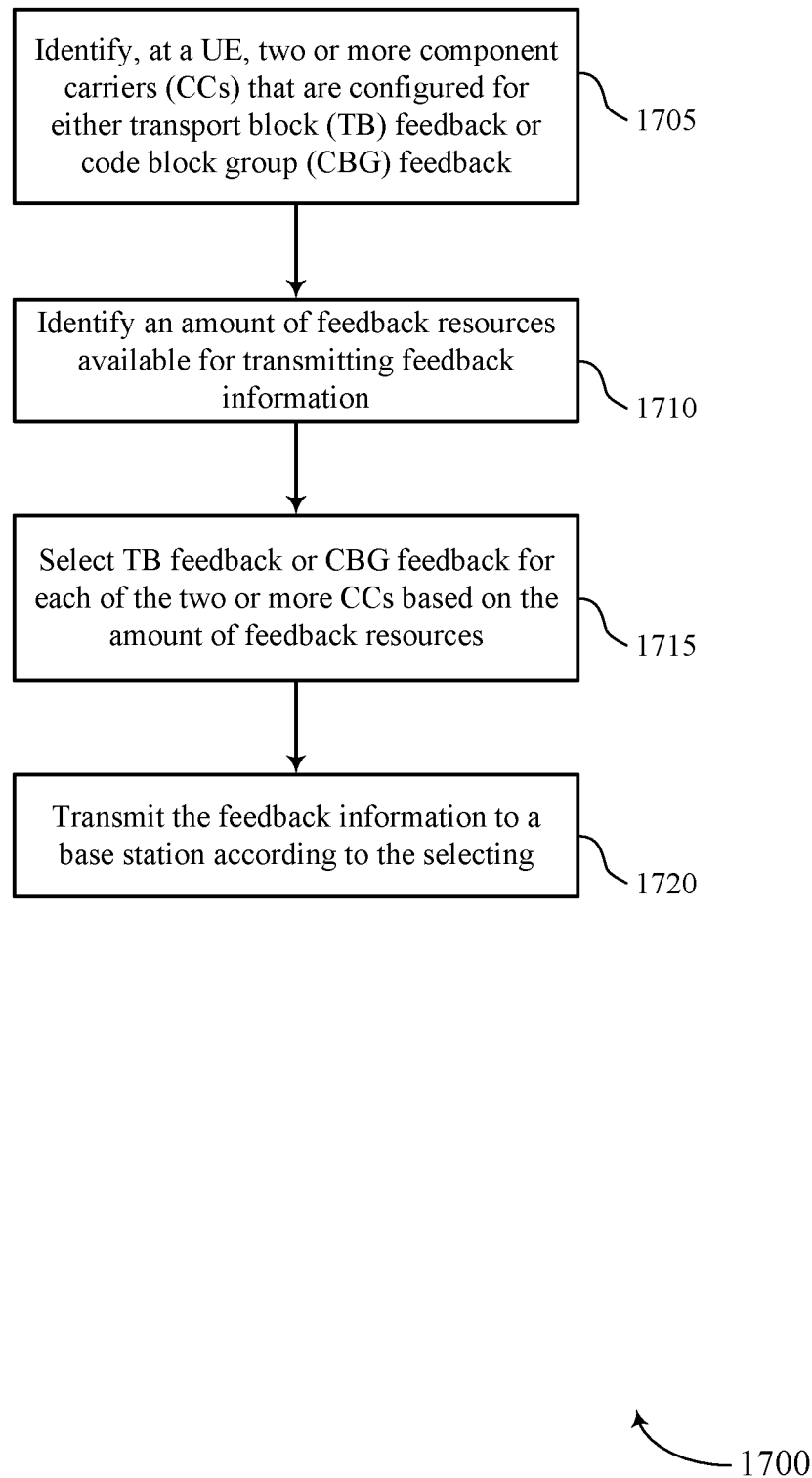
FIGS. 17 through 20 illustrate methods for CBG feedback techniques for multiple carriers or TTIs in accordance with aspects of the present disclosure.

FIG. 17 shows a flowchart illustrating a method 1700 for CBG feedback techniques for multiple carriers or TTIs in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify two or more CCs that are configured for either TB feedback or CBG feedback (e.g., the TB feedback and the CBG feedback indicating successful or unsuccessful receipt of data in each CC). The operations of block 1705 may be performed according to the methods described herein. In certain examples, aspects of the operations of block 1705 may be performed by a CA manager as described with reference to FIGS. 9 through 12.

At block 1710 the UE 115 may identify an amount of feedback resources available for transmitting feedback information. The operations of block 1710 may be performed according to the methods described herein. In certain examples, aspects of the operations of block 1710 may be performed by a feedback manager as described with reference to FIGS. 9 through 12.

At block 1715 the UE 115 may select TB feedback or CBG feedback for each of the two or more CCs based at least in part on the amount of feedback resources. The operations of block 1715 may be performed according to the methods described herein. In certain examples, aspects of the operations of block 1715 may be performed by a feedback selection component as described with reference to FIGS. 9 through 12.

At block 1720 the UE 115 may transmit the feedback information to a base station according to the selecting. The operations of block 1720 may be performed according to the methods described herein. In certain examples, aspects of the operations of block 1720 may be performed by a feedback transmission component as described with reference to FIGS. 9 through 12.

Figure 18:
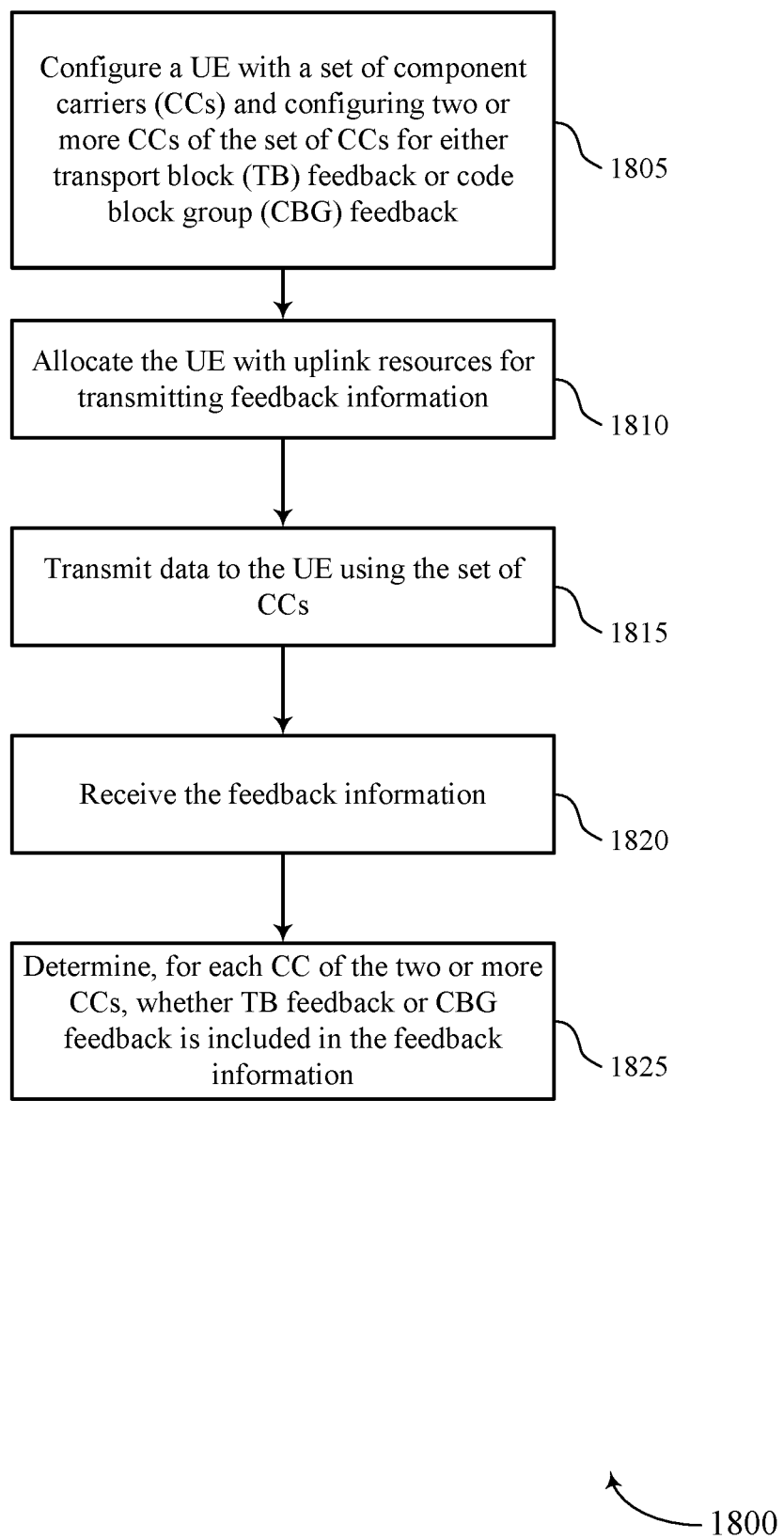

FIG. 18 shows a flowchart illustrating a method 1800 for CBG feedback techniques for multiple carriers or TTIs in accordance with aspects of the present disclosure. The operations of method 1800 may be implemented by a base station 105 or its components as described herein. For example, the operations of method 1800 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may configure a UE with a plurality of CCs and configuring two or more CCs of the plurality of CCs for either TB feedback or CBG feedback (e.g., for indicating successful or unsuccessful receipt of data in each CC). The operations of block 1805 may be performed according to the methods described herein. In certain examples, aspects of the operations of block 1805 may be performed by a CA manager as described with reference to FIGS. 13 through 16.

At block 1810 the base station 105 may allocate the UE with uplink resources for transmitting feedback information. The operations of block 1810 may be performed according to the methods described herein. In certain examples, aspects of the operations of block 1810 may be performed by a resource allocation component as described with reference to FIGS. 13 through 16.

At block 1815 the base station 105 may transmit data to the UE using the plurality of CCs. The operations of block 1815 may be performed according to the methods described herein. In certain examples, aspects of the operations of block 1815 may be performed by a data transmission component as described with reference to FIGS. 13 through 16.

At block 1820 the base station 105 may receive the feedback information (e.g., indicating successful or unsuccessful receipt of data in each CC). The operations of block 1820 may be performed according to the methods described herein. In certain examples, aspects of operations of block 1820 may be performed by a feedback manager as described with reference to FIGS. 13 through 16.

At block 1825 the base station 105 may determine, for each CC of the two or more CCs, whether TB feedback or CBG feedback is included in the feedback information. The operations of block 1825 may be performed according to the methods described herein. In certain examples, aspects of the operations of block 1825 may be performed by a feedback manager as described with reference to FIGS. 13 through 16.

Figure 19:
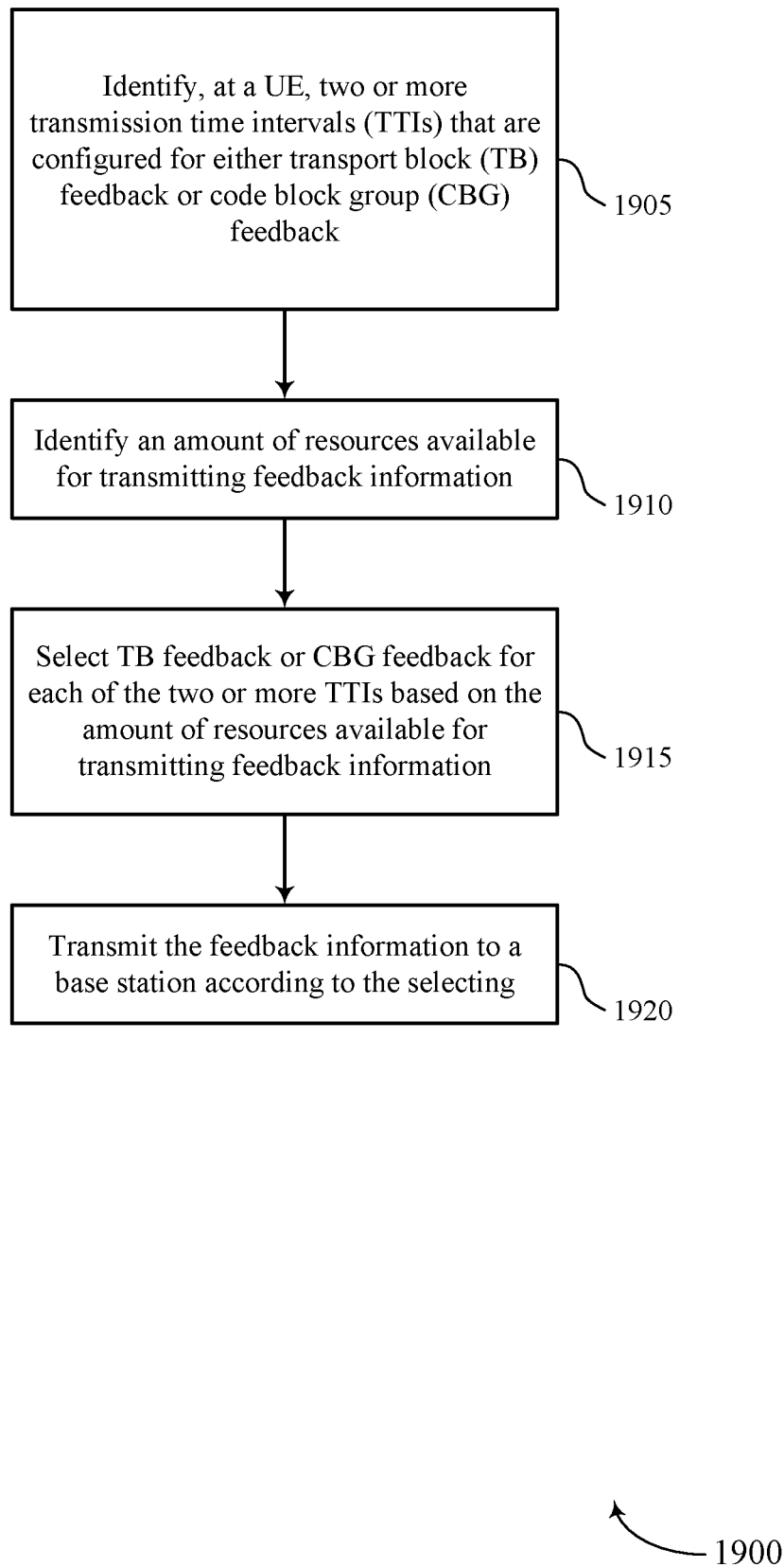

FIG. 19 shows a flowchart illustrating a method 1900 for CBG feedback techniques for multiple carriers or TTIs in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may identify two or more TTIs that are configured for either TB feedback or CBG feedback (e.g., for indicating successful or unsuccessful receipt of data in each TTI). The operations of block 1905 may be performed according to the methods described herein. In certain examples, aspects of the operations of block 1905 may be performed by a TTI manager as described with reference to FIGS. 9 through 12.

At block 1910 the UE 115 may identify an amount of resources available for transmitting feedback information. The operations of block 1910 may be performed according to the methods described herein. In certain examples, aspects of the operations of block 1910 may be performed by a feedback manager as described with reference to FIGS. 9 through 12.

At block 1915 the UE 115 may select TB feedback or CBG feedback for each of the two or more TTIs based at least in part on the amount of resources available for transmitting feedback information. The operations of block 1915 may be performed according to the methods described herein. In certain examples, aspects of the operations of block 1915 may be performed by a feedback selection component as described with reference to FIGS. 9 through 12.

At block 1920 the UE 115 may transmit the feedback information to a base station according to the selecting. The operations of block 1920 may be performed according to the methods described herein. In certain examples, aspects of the operations of block 1920 may be performed by a feedback transmission component as described with reference to FIGS. 9 through 12.

Figure 20:
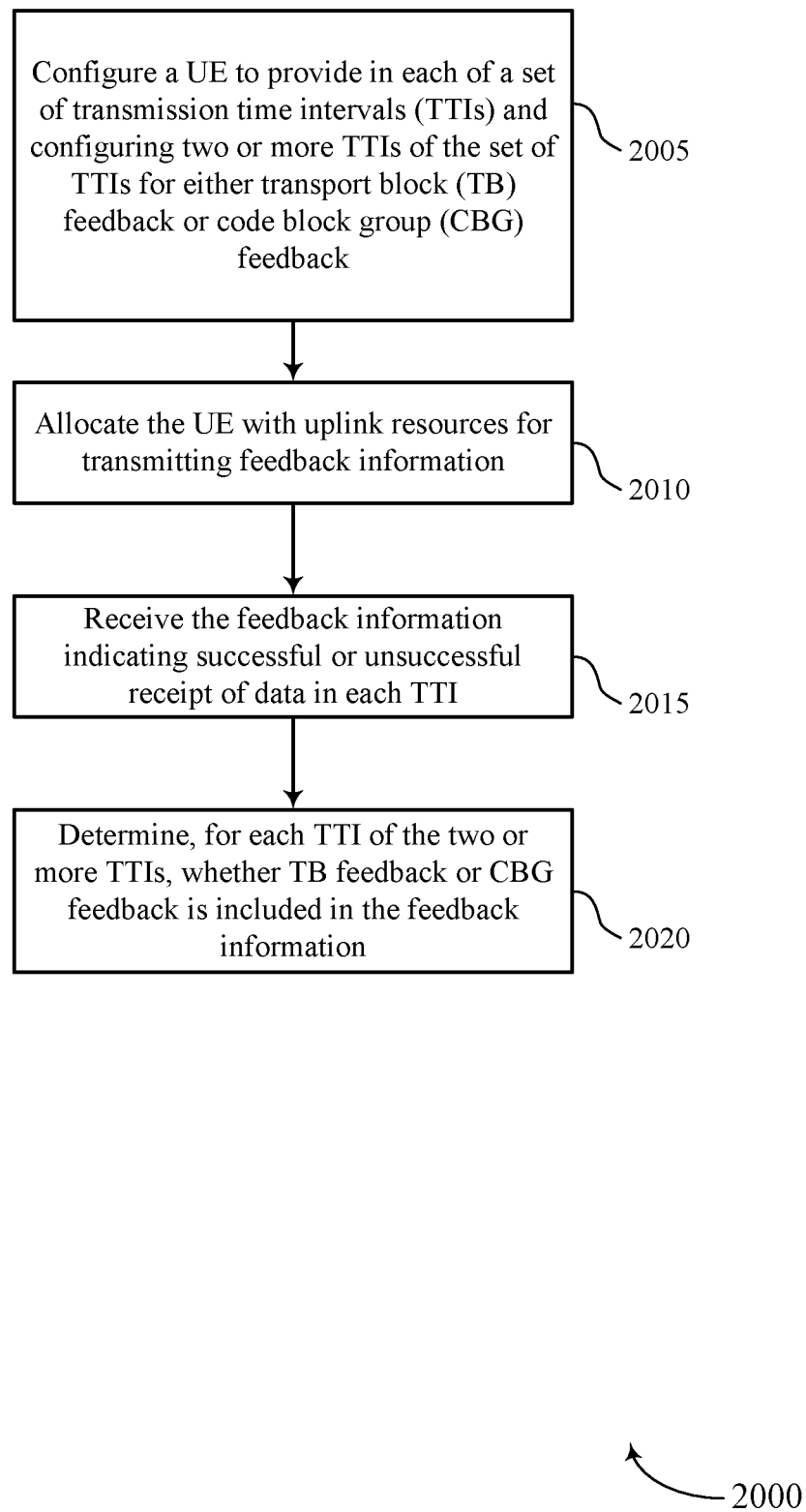

FIG. 20 shows a flowchart illustrating a method 2000 for CBG feedback techniques for multiple carriers or TTIs in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may configure a UE to provide feedback (e.g., for indicating successful or unsuccessful receipt of data) in each of a plurality of TTIs and configuring two or more TTIs of the plurality of TTIs for either TB feedback or CBG feedback. The operations of block 2005 may be performed according to the methods described herein. In certain examples, aspects of the operations of block 2005 may be performed by a TTI manager as described with reference to FIGS. 13 through 16.

At block 2010 the base station 105 may allocate the UE with uplink resources for transmitting feedback information. The operations of block 2010 may be performed according to the methods described herein. In certain examples, aspects of the operations of block 2010 may be performed by a resource allocation component as described with reference to FIGS. 13 through 16.

At block 2015 the base station 105 may receive the feedback information indicating successful or unsuccessful receipt of data in each TTI. The operations of block 2015 may be performed according to the methods described herein. In certain examples, aspects of the operations of block 2015 may be performed by a feedback manager as described with reference to FIGS. 13 through 16.

At block 2020 the base station 105 may determine, for each TTI of the two or more TTIs, whether TB feedback or CBG feedback is included in the feedback information. The operations of block 2020 may be performed according to the methods described herein. In certain examples, aspects of the operations of block 2020 may be performed by a feedback manager as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying, at a user equipment (UE), two or more component carriers (CCs) that are configured to support transport block (TB) level feedback and code block group (CBG) level feedback;
identifying an amount of feedback resources available for transmitting feedback information;
selecting between using TB level feedback and CBG level feedback for each of the two or more CCs based at least in part on the identified amount of feedback resources available; and
transmitting the feedback information to a base station according to the selecting.

2. The method of claim 1, wherein the selecting comprises:
determining a first number of CCs for which CBG level feedback can be supported based at least in part on the identified amount of feedback resources available, the first number of CCs being less than a second number of CCs that are configured to support TB level feedback and CBG level feedback; and selecting to use CBG level feedback for at least a first CC of the two or more CCs and to use TB level feedback for at least a second CC of the two or more CCs.

3. The method of claim 2, wherein selecting to use CBG level feedback and TB level feedback for the first CC and the second CC, respectively, based at least in part on an error pattern associated with each CC.

4. The method of claim 2, wherein selecting to use CBG level feedback and TB level feedback for the first CC and the second CC, respectively, based at least in part on whether UE is scheduled on each CC.

5. The method of claim 1, wherein the transmitting comprises:
 transmitting an indication of which of the two or more CCs have CBG level feedback;
 transmitting the CBG level feedback for each CC of the two or more CCs that are selected to be used for CBG level feedback; and
 transmitting TB level feedback for any remaining CCs.

6. The method of claim 5, wherein:
 the indication of which of the two or more CCs have CBG level feedback comprises a CC index; and
 the CBG level feedback comprises a bitmap indicating which CBGs of an associated CC are successfully and unsuccessfully received.

7. The method of claim 1, wherein the transmitting comprises:
 transmitting TB level feedback for each CC;
 transmitting an indication of which of the two or more CCs have CBG level feedback; and
 transmitting the CBG level feedback for each CC of the two or more CCs that are selected to be used for CBG level feedback.

8. The method of claim 1, wherein the transmitting further comprises:
 zero-padding any remaining resources of the identified amount of feedback resources available for transmitting feedback information following the feedback information.

9. The method of claim 1, wherein the identifying the two or more CCs that are configured to support TB level feedback and CBG level feedback comprises:
 receiving a configuration having a first ordered list that indicates a first plurality of CCs that are configured at the UE and a second ordered list that indicates the two or more CCs as at least a subset of the first ordered list.

10. The method of claim 9, wherein the transmitting comprises:
 transmitting an index of which CC of the second ordered list has CBG level feedback included in the feedback information.

11. The method of claim 9, wherein the two or more CCs configured to support TB level feedback and CBG level feedback comprise a first number of CCs and an amount of feedback resources of the identified feedback resources available that supports CBG level feedback comprises a second number of CCs that is less than the first number of CCs, and wherein the selecting comprises selecting the second number of CCs of the two or more CCs to be used for CBG level feedback and selecting the remaining CCs of the two or more CCs to be used for TB level feedback.

12. The method of claim 9, wherein the transmitting comprises:
 transmitting a first index indicating a first CC of the second ordered list that has CBG level feedback included in the feedback information; and
 transmitting a first bitmap indicating which CBGs of the first CC are successfully and unsuccessfully received.

13. The method of claim 12, further comprising:
 determining that the identified amount of feedback resources available can accommodate CBG level feedback for another CC; and
 wherein the transmitting comprises:
  transmitting, responsive to the determining, a second index indicating a second CC of the second ordered list that has CBG level feedback included in the feedback information responsive to the determining; and
  transmitting, responsive to the determining, a second bitmap indicating which CBGs of the second CC are successfully and unsuccessfully received responsive to the determining.

14. The method of claim 9, wherein the transmitting comprises:
 transmitting a CBG field that indicates the number of CCs with CBG level feedback included in the feedback information; and
 transmitting a first CC index and a first bitmap indicating which CBGs of a first CC indicated in the CBG field are successfully and unsuccessfully received.

15. The method of claim 14, further comprising:
 determining that the identified amount of feedback resources available can accommodate CBG level feedback for another CC; and
 wherein the transmitting comprises:
  transmitting, responsive to the determining, a second CC index and a second bitmap indicating which CBGs of a second CC indicated in the CBG field are successfully and unsuccessfully received.

16. The method of claim 9, wherein the transmitting comprises:
 transmitting a CBG field that indicates the number of CCs with CBG level feedback included in the feedback information;
 transmitting TB level feedback for each CC of the first ordered list that are not included in the CBG field; and
 transmitting a first CC index and a first bitmap indicating which CBGs of a first CC indicated in the CBG field are successfully and unsuccessfully received.

17. The method of claim 16, further comprising:
 determining that the identified amount of feedback resources available can accommodate CBG level feedback for another CC; and
 wherein the transmitting comprises:
  transmitting, responsive to the determining, a second CC index and a second bitmap indicating which CBGs of a second CC indicated in the CBG field are successfully and unsuccessfully received.

18. A method for wireless communication, comprising:
 configuring a user equipment (UE) with a plurality of component carriers (CCs) and configuring two or more CCs of the plurality of CCs to support transport block (TB) level feedback and code block group (CBG) level feedback;
 allocating the UE with uplink resources for transmitting feedback information;
 transmitting data to the UE using the plurality of CCs;
 receiving the feedback information; and
 determining, for each CC of the two or more CCs, whether TB level feedback or CBG level feedback is included in the feedback information by receiving an indication that indicates which of the two or more CCs have CBG level feedback.

19. The method of claim 18, wherein the determining comprises identifying a CC index within the feedback information that indicates which of the two or more CCs have CBG level feedback.

20. The method of claim 18, wherein the feedback information comprises CBG level feedback that includes a bitmap indicating which CBGs of an associated CC are successfully and unsuccessfully received.

21. The method of claim 20, wherein the feedback information further comprises TB level feedback for each CC.

22. The method of claim 20, wherein the feedback information further comprises TB level feedback for each CC for which CBG feedback is not provided.

23. A method for wireless communication, comprising:
configuring a user equipment (UE) with a plurality of component carriers (CCs) and configuring two or more CCs of the plurality of CCs to support transport block (TB) level feedback and code block group (CBG) level feedback;
allocating the UE with uplink resources for transmitting feedback information;
transmitting data to the UE using the plurality of CCs;
receiving the feedback information;
determining, for each CC of the two or more CCs, whether TB level feedback or CBG level feedback is included in the feedback information; and
transmitting configuration information having a first ordered list that indicates a first plurality of CCs that are configured at the UE and a second ordered list that indicates the two or more CCs as at least a subset of the first ordered list.

24. The method of claim 23, wherein the determining comprises:
identifying an index within the feedback information that indicates which CC of the second ordered list has CBG level feedback.

\* \* \* \* \*